United States Patent
Schilling et al.

(10) Patent No.: US 10,210,324 B2
(45) Date of Patent: Feb. 19, 2019

(54) DETECTING MALICIOUS INSTRUCTIONS ON A VIRTUAL MACHINE

(71) Applicant: Armor Defense Inc., Richardson, TX (US)

(72) Inventors: Jeffery Ray Schilling, Murphy, TX (US); Chase Cooper Cunningham, Frisco, TX (US); Tawfiq Mohan Shah, Argyle, TX (US); Srujan Das Kotikela, Dallas, TX (US)

(73) Assignee: Armor Defense Inc., Richardson, TX (US)

( * ) Notice: Subject to any disclaimer, the term of this patent is extended or adjusted under 35 U.S.C. 154(b) by 170 days.

(21) Appl. No.: 15/169,282

(22) Filed: May 31, 2016

(65) Prior Publication Data

US 2017/0149807 A1    May 25, 2017

Related U.S. Application Data

(60) Provisional application No. 62/258,730, filed on Nov. 23, 2015.

(51) Int. Cl.
*G06F 21/53* (2013.01)
*G06F 21/56* (2013.01)
(Continued)

(52) U.S. Cl.
CPC .......... *G06F 21/53* (2013.01); *G06F 9/45545* (2013.01); *G06F 9/45558* (2013.01); *G06F 12/1009* (2013.01); *G06F 17/30424* (2013.01); *G06F 17/30598* (2013.01); *G06F 21/54* (2013.01); *G06F 21/56* (2013.01); *G06F 21/561* (2013.01); *G06F 21/565* (2013.01); *G06F 21/566* (2013.01); *H04L 63/0227* (2013.01);
(Continued)

(58) Field of Classification Search
CPC ................. G06F 21/56; G06F 21/53
USPC ........................................... 726/1
See application file for complete search history.

(56) References Cited

U.S. PATENT DOCUMENTS

| | | | | |
|---|---|---|---|---|
| 9,250,969 | B2 * | 2/2016 | Lagar-Cavilla | G06F 9/5077 |
| 9,405,899 | B2 * | 8/2016 | Khesin | G06F 21/566 |
| 9,483,644 | B1 * | 11/2016 | Paithane | G06F 17/30144 |
| 9,530,007 | B1 * | 12/2016 | Allen | G06F 21/577 |

(Continued)

OTHER PUBLICATIONS

International Search Report and Written Opinion of the International Searching Authority, International Application No. PCT/US16/62173, dated Apr. 17, 2017, 18 pages.

*Primary Examiner* — Peter C Shaw
(74) *Attorney, Agent, or Firm* — Baker Botts L.L.P.

(57) ABSTRACT

A system that includes a hypervisor configured to communicate packets comprising virtual machine operating characteristics metadata for guest virtual machines. The system further includes a virtual vault machine comprising a hypervisor device driver, a hypervisor device driver interface, and an analysis tool. The hypervisor device driver is configured to receive a packet comprising virtual machine operating characteristics metadata for a guest virtual machine and to communicate the virtual machine operating characteristics metadata to an analysis tool using the hypervisor device driver interface. The analysis tool is configured to correlate the virtual machine operating characteristics metadata to one of a cluster of known healthy guest virtual machines or a cluster of known compromised guest virtual machines using a machine learning algorithm and to classify the guest virtual machine.

17 Claims, 11 Drawing Sheets

(51) Int. Cl.
*G06F 9/455* (2018.01)
*G06F 17/30* (2006.01)
*G06F 12/1009* (2016.01)
*H04L 29/06* (2006.01)
*G06F 21/54* (2013.01)

(52) U.S. Cl.
CPC ...... H04L 63/1408 (2013.01); H04L 63/1416 (2013.01); H04L 63/1425 (2013.01); *G06F 21/567* (2013.01); *G06F 2009/45579* (2013.01); *G06F 2009/45583* (2013.01); *G06F 2009/45587* (2013.01); *G06F 2009/45591* (2013.01); *G06F 2009/45595* (2013.01); *G06F 2212/1052* (2013.01); *G06F 2212/152* (2013.01); *G06F 2212/154* (2013.01); *G06F 2221/034* (2013.01); *G06F 2221/2149* (2013.01)

(56) References Cited

U.S. PATENT DOCUMENTS

| | | |
|---|---|---|
| 2007/0260939 A1 | 11/2007 | Kammann et al. |
| 2010/0268981 A1 | 10/2010 | Xiang |
| 2011/0246986 A1* | 10/2011 | Nicholas ............. G06F 11/0712 718/1 |
| 2011/0299537 A1* | 12/2011 | Saraiya ............... H04L 61/2596 370/392 |
| 2011/0314339 A1 | 12/2011 | Daily et al. |
| 2012/0096550 A1 | 4/2012 | Sapuntzakis et al. |
| 2013/0227355 A1 | 8/2013 | Dake et al. |
| 2015/0271139 A1* | 9/2015 | Lukacs ............... H04L 63/0209 726/11 |
| 2016/0026490 A1* | 1/2016 | Johnsson ............. H04L 43/0864 718/1 |
| 2017/0099197 A1* | 4/2017 | Raney ................... H04L 43/028 |
| 2017/0351861 A1* | 12/2017 | El-Moussa ........... G06F 21/566 |

* cited by examiner

DETECTING MALICIOUS INSTRUCTIONS ON A VIRTUAL MACHINE

CROSS-REFERENCE TO RELATED APPLICATIONS

The present application claims benefit of U.S. Provisional Patent Application No. 62/258,730 filed Nov. 23, 2015 by Jeffery R. Schilling, et al., and entitled "SYSTEM AND METHOD FOR DETECTING MALICIOUS INSTRUCTIONS ON A VIRTUAL MACHINE," which is incorporated herein by reference as if reproduced in its entirety.

TECHNICAL FIELD

The present disclosure relates generally to computer security and computer threat detection, and more specifically to detecting malicious instructions on a virtual machine.

BACKGROUND

Cloud computing and virtual computing systems have opened a new door for hackers and other malicious users to gain control of a computer to use its processing power for their purposes and/or to gain access to any sensitive information contained on the computer. Attacks or intrusions of the computing system may compromise the integrity of the system and/or the data stored on the system. The stakes are even higher in a cloud environment, where many users share the same physical resources. Users desire cloud and virtual computing systems to operate with the same level of security as physical computing systems so that they can be confident that their sensitive information is safe.

SUMMARY

In one embodiment, the disclosure includes a system that includes a virtual management console, a hypervisor, and a virtual vault machine. The hypervisor is configured to communicate packets comprising virtual machine operating characteristics metadata for guest virtual machines. The virtual vault machine is in communication with the virtual management console and the hypervisor and comprises a hypervisor device driver, a hypervisor device driver interface, and an analysis tool. The hypervisor device driver is implemented by a processor to operate in a kernel space of the virtual vault machine. The hypervisor device driver is configured to receive a packet comprising virtual machine operating characteristics metadata for a guest virtual machine and to communicate the virtual machine operating characteristics metadata to an analysis tool using the hypervisor device driver interface. The hypervisor device driver interface is implemented by the processor, and is configured to communicate the virtual machine operating characteristics metadata from the hypervisor device driver in the kernel space of the virtual vault machine to the analysis tool in a user space of the virtual vault machine. The analysis tool is implemented by the processor to operate in the user space of the virtual vault machine. The analysis tool is configured to correlate the virtual machine operating characteristics metadata to one of a cluster of known healthy guest virtual machines or a cluster of known compromised guest virtual machines using a machine learning algorithm. The analysis tool is further configured to classify the guest virtual machine as healthy when the virtual machine operating characteristics metadata correlates with the cluster of known healthy guest virtual machines and to classify the guest virtual machine as compromised when the virtual machine operating characteristics metadata correlates with the cluster of known compromised guest virtual machines. The analysis tool is further configured to generate analysis results by combining at least a portion of the virtual machine operating characteristics metadata with the determined classification and to communicate the analysis results to the virtual management console.

In another embodiment, the disclosure includes a virtual machine intrusion detection method that includes receiving a packet comprising virtual machine operating characteristics metadata for a guest virtual machine and communicating the virtual machine operating characteristics metadata from the hypervisor device driver in a kernel space of a virtual vault machine to an analysis tool in a user space of the virtual vault machine using a hypervisor device driver interface implemented by the processor. The method further includes correlating the virtual machine operating characteristics metadata to one of a cluster of known healthy guest virtual machines or a cluster of known compromised guest virtual machines using a machine learning algorithm and classifying the virtual machine operating characteristics metadata as one of healthy or compromised based on the correlation. The virtual machine operating characteristics metadata is classified as healthy when the virtual machine operating characteristics correlates with the cluster of known healthy guest virtual machines. The virtual machine operating characteristics metadata is classified as compromised when the virtual machine operating characteristics correlates with the cluster of known compromised guest virtual machines. The method further includes generating analysis results by combining at least a portion of the virtual machine operating characteristics metadata with the determined classification and communicating the analysis results to a virtual management console.

The present embodiment presents several technical advantages to technical problems. In one embodiment, a detection system is configured to monitoring a system and its data to prevent and/or detect an intrusion or attack. For example, the detection may be configured to monitor a system for an intrusion by malicious instructions or an unauthorized user. The detection system may monitor and analyze a guest virtual machine in a secure region of a virtual network such that the possibly compromised guest virtual machine is unaware that it is being monitored. The detection system comprises a virtual vault machine that is isolated from guest virtual machines, which allows the virtual vault machine to perform analysis outside of a possibly infected environment and reduces influences from malicious instructions or code. The detection system is configured to obtain virtual machine operating characteristics metadata for a guest virtual machine and to analyze the virtual machine operating characteristics metadata without degrading the performance of the guest virtual machine. The detection system also may be configured to analyze multiple guest virtual machines simultaneously. The detection system may also be configured to capture instructions performed by malicious code, which can be used to analyze the behavior of malicious code for determining when a guest virtual machine is compromised.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
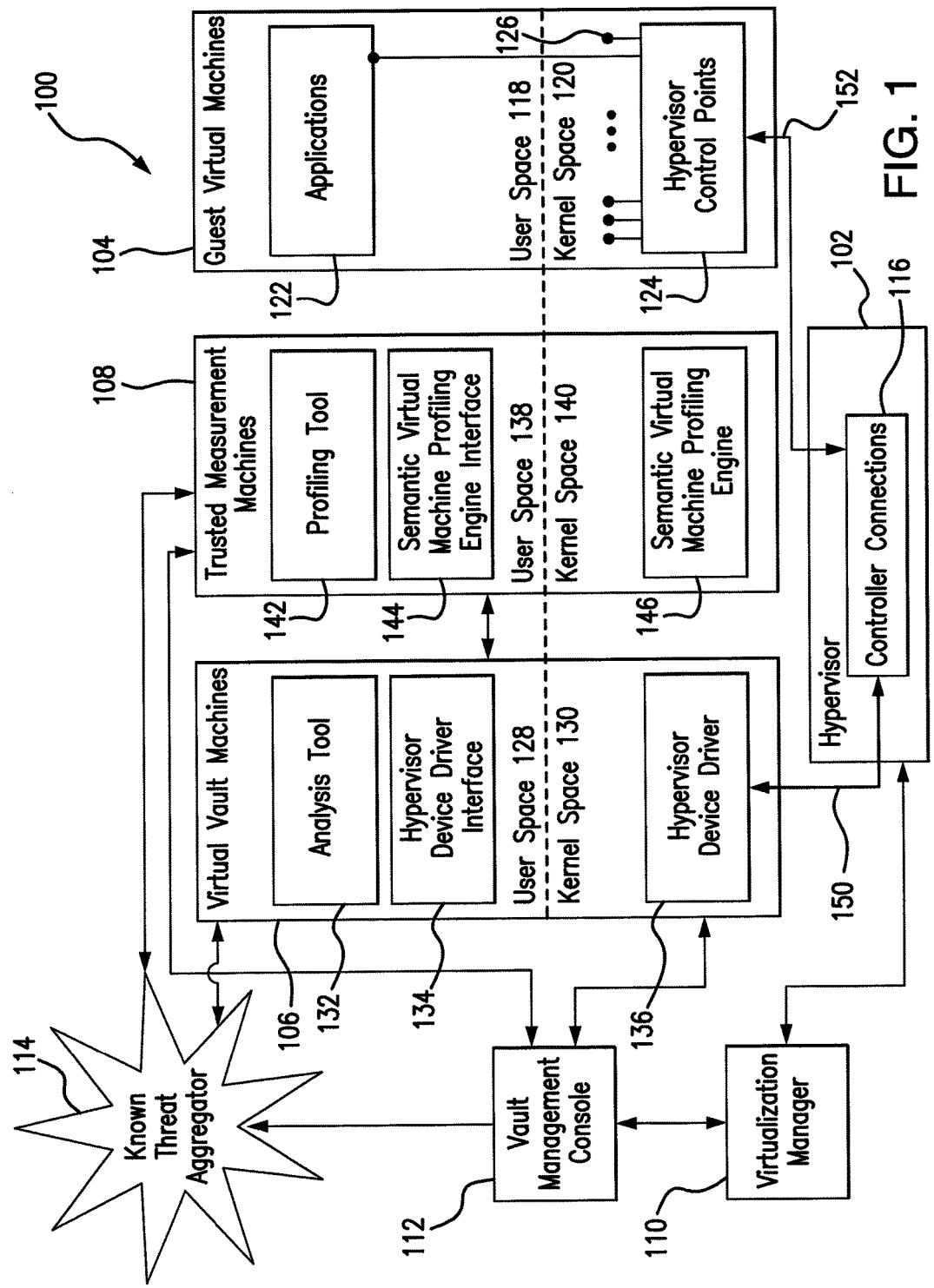
FIG. 1 is a schematic diagram of an embodiment of a detection system for detecting malicious instructions on a guest virtual machine.

Disclosed herein are various embodiments for providing computer security, and, more specifically, to monitoring and detecting malicious or anomalous activity (e.g. an intrusion or an attack) in a virtual network environment such as a cloud computing environment. Malicious activities, such as, an intrusion or an attack by malicious instructions, in cloud computing environments presents inherent technical problems. Examples of such technical problems include that malicious actors may be able to disguise malicious activity as normal system activity, for example, if the malicious actor is capable of obfuscating the hard disk or network activities that can be monitored by the cloud computing environment. Additionally, malicious actors may be capable of intercepting and altering activity information as it is being communicated for the purposes of malicious activity analysis. For example, malicious actors may be able to intercept activity information and to sanitize the information to hide malicious activity that is occurring in the cloud computing environment. Malicious activities may compromise the integrity of a computing system and/or the data stored on the system.

To address these technical problems, a detection system may be configured to monitor and detect anomalous or malicious activity, such as, an intrusion or attack, in guest virtual machines within a public region of a virtual network. Monitoring for anomalous or malicious activity may allow the detection system to ensure the data integrity of a computing system by preventing and/or detecting an intrusion or attack. The detection system may periodically collect information (e.g., metadata or any other appropriate data) from one or more guest virtual machines to determine whether any malicious activity is present. The detection system employs a hypervisor for a guest virtual machine to communicate the instructions for collecting metadata from the guest virtual machine and to forward the collected metadata to a virtual vault machine within a secure region of the virtual network for processing. The hypervisor is configured to employ secure connections between the hypervisor and the virtual vault machine that allow the virtual vault machine to be isolated from other regions of the virtual network.

The virtual vault machine may analyze the metadata of the virtual vault machine to determine whether any malicious activity is present. For example, the virtual vault machine may employ a machine learning algorithm to process the metadata of the guest virtual machine and to determine whether any malicious activity is present. Additionally or alternatively, the virtual vault machine may forward at least a portion of the metadata of the guest virtual machine to a trusted measurement machine for a comparative analysis. For example, the trusted measurement machine may compare the metadata of the guest virtual machine to metadata for known compromised and/or healthy guest virtual machine to determine a classification (e.g. healthy or compromised) for the guest virtual machine. The results of the analysis by the virtual vault machine and/or the trusted measurement machine may be reported to a user (e.g. a security administrator) when a guest virtual machine has been compromised. The results of the analysis by the virtual vault machine and/or the trusted measurement machine may also be stored and used for analyzing other guest virtual machines.

FIG. 1 is a schematic diagram of an embodiment of a detection system 100 for detecting malicious instructions on a guest virtual machine 104. Detection system 100 is configured to measure virtual machine operating characteristics metadata from guest virtual machines 104 using hypervisor control points 124 and virtual machine measurement points 126 and to send the virtual machine operating characteristics metadata to virtual vault machine 106 for analysis using a secure connection. Virtual vault machine 106 is configured to analyze the virtual machine operating characteristics metadata to detect anomalous activity on the guest virtual machine 104. Virtual vault machine 106 may use information from known threat aggregator 114 and/or trusted measurement machine 108 to determine whether a guest virtual machine 104 is compromised. Detection system 100 may be configured to analyze multiple guest virtual machines 104 simultaneously.

Detection system 100 comprises hypervisor 102, one or more guest virtual machines 104, one or more virtual vault machines 106, one or more trusted measurement machines 108, virtualization manager 110, vault management console 112, and known threat aggregator 114. Detection system 100 may be configured as shown or in any other suitable configuration. In an embodiment, hypervisor 102 and guest virtual machines 104 are located in a public region of a virtual network and virtual vault machines 106, trusted measurement machines 108, known threat aggregator 114, and vault management console 112 are located in a secure region of the virtual network.

Hypervisor 102, guest virtual machines 104, virtual vault machines 106, trusted measurement machines 108, virtualization manager 110, vault management machine 112, and known threat aggregator 114 may be implemented using or executed on one or more physical machines. In an embodiment, a physical machine may comprise a memory, a processor, a network interface, and an input/output (I/O) interface. For example, the memory may comprise one or more disks, tape drives, or solid-state drives, and may be used as an over-flow data storage device, to store programs when such programs are selected for execution, and to store instructions and data that is read during execution. The memory may comprise read-only memory (ROM), random-access memory (RAM), ternary content-addressable memory (TCAM), dynamic random-access memory (DRAM), and static random-access memory (SRAM).

The processor may be implemented as one or more central processing unit (CPU) chips, logic units, cores (e.g. as a multi-core processor), field-programmable gate arrays (FPGAs), application specific integrated circuits (ASICs), or digital signal processors (DSPs). The processor is operably coupled to and in signal communication with the memory, the network interface, and the I/O interface. The processor is configured to receive and transmit electrical signals among one or more of the memory, the network interface, and the I/O interface. The processor is configured to process data and may be implemented in hardware or software. An I/O interface may comprise ports, transmitters, receivers, transceivers, or any other devices for transmitting and receiving data as would be appreciated by one of ordinary skill in the art upon viewing this disclosure. The network interface may be configured to enable wired and/or wireless communications and to communicate data through a network, virtual network, system, and/or domain. For example, a network interface may comprise or may be integrated with a modem, a switch, a router, a bridge, a server, or a client.

Hypervisor 102 is operably coupled to and configured to exchange (i.e. transmit and receive) data with guest virtual machines 104, virtual vault machines 106, and virtualization manager 110. Hypervisor 102 is configured to exchange data with virtual vault machine 106 using a secure virtual network connection 150, to exchange data with guest virtual machine 104 using a hypervisor connecting interface 152, and to exchange data with virtualization manager 110 using an appropriate interface, for instance, a Representational State Transfer Application Programming Interface (REST API). Secure virtual network connection 150 may be configured to isolate virtual vault machine 106 from client-facing portions of the virtual network. Secure virtual network connection 150 may include one or more virtual switches and/or firewalls configured to provide security features for the secure portion of the network. Secure virtual network connection 150 may employ encryption and/or tunneling to provide a secure connection between hypervisor 102 and virtual vault machines 106. For example, the secure virtual connection 150 may comprise a tunnel connection with one or more virtual switches. In an embodiment, secure virtual network connection 150 may be or may include a socket connection between hypervisor 102 (e.g., controller connections 116) and virtual vault machine 106 (e.g. hypervisor device driver 136). Alternatively, any other protected connection may be employed between hypervisor 102 and virtual vault machine 106.

Secure virtual network connection 150 may also be configured to employ policy rules. For example, secure virtual network connection 150 may be configured to employ policy rules that accept data (e.g. packets) only from known sources (e.g. controller connections 116) and/or rejects data (e.g. packets) from unknown sources. Hypervisor connecting interface 152 is configured to provide a secure virtual connection between hypervisor 102 and guest virtual machines 104. Hypervisor connecting interface 152 may employ encryption, tunneling, and/or a firewall to reduce the risk of a guest virtual machine 104 propagating malicious instructions, code, files, or data through hypervisor 102 to virtual vault machines 106. Secure virtual network connection 150 and hypervisor connecting interface 152 provide a path among virtual vault machine 106, hypervisor 102, and a guest virtual machine 104 that enables secure one-way data pulls or extractions from the guest virtual machine 104 to the virtual vault machine 106. In an embodiment, packets sent from the hypervisor control points 124 to virtual vault machine 106 may comprise encrypted payloads without an address header or address information (e.g. a source address and/or a destination address).

Hypervisor 102 may be configured to create, manage, and connect guest virtual machines 104 within a virtual network such as a cloud computing environment. In an embodiment, hypervisor 102 may be configured to create virtual appliances including, but not limited to, virtual switches, virtual firewalls, and virtual routers. Virtual appliances are configured to establish connections between or among components within a virtual network. Such virtual components may, in certain embodiments, be constructs created by way of software working in concert with hardware components provided by detection system 100.

Hypervisor 102 is configured to establish connections between the hypervisor 102 and guest virtual machines 104, to request virtual machine operating characteristics metadata from a guest virtual machine 104, and to receive the requested virtual machine operating characteristics metadata from a hypervisor control points 124 of the guest virtual machine 104 in response to the request. The received virtual machine operating characteristics metadata may be forwarded to virtual vault machine 106 for processing and analysis.

Hypervisor 102 may request virtual machine operating characteristics metadata from the guest virtual machine 104 continuously, at predetermined time intervals, in response to a user request for data, or in response to an event notification. In an embodiment, hypervisor 102 is configured to request virtual machine operating characteristics metadata in response to a user request from virtualization manager 110. In another embodiment, hypervisor 102 may be configured to request virtual machine operating characteristics metadata in response to automated requests from virtual vault machine 106 using the secure virtual network connection 150. An event notification may comprise, in certain embodiments, a message that notifies hypervisor 102 that a trigger event has occurred. Examples of trigger events include, but are not limited to, a timer expiring or abnormal behavior in a guest virtual machine 104. Hypervisor 102 is configured to generate a measurement request and send the measurement request to hypervisor control points 124 in a guest virtual machine 104. Measurement requests may comprises information that indicates which guest virtual machine 104 and virtual machine operating characteristics metadata to collect and any additional instructions for acquiring the virtual machine operating characteristics metadata such as a duration for collecting the metadata.

Hypervisor 102 comprises controller connections 116. Controller connections 116 are configured to receive measurement commands from hypervisor 102 and to send a measurement request to hypervisor control points 124 in response to receiving the measurement command. The measurement command may comprise a list of requested virtual machine operating characteristics metadata, durations for collecting the requested virtual machine operating characteristics metadata, and/or a preferred format for the virtual machine operating characteristics metadata for a response to a measurement request. Controller connections 116 are also configured to receive virtual machine operating characteristics metadata from hypervisor control points 124 in response to sending the measurements request, and to forward the virtual machine operating characteristics metadata to hypervisor 102.

In certain embodiments, guest virtual machines 104 comprise computing resources that are available for cloud computing, cloud storage, or other virtual network operations. Guest virtual machines 104 may provide computing resources that may not be directly correlated to a physical machine. Guest virtual machines 104 may be configured to be controlled, managed, or aided by hypervisor 102 or vault management console 112. In an embodiment, guest virtual machine 104 and a corresponding hypervisor 102 may reside on the same physical machine. In another embodiment, guest virtual machine 104 and a corresponding hypervisor 102 may reside on different physical machines. Any suitable number of guest virtual machines 104 may reside on the same physical machine.

Guest virtual machines 104 may comprise a user space 118 and a kernel space 120. Instructions executed in a user space (e.g. user space 118) may have limited permission to system resources while instructions executed in a kernel space (e.g. kernel space 120) are provided with permissive exposure to system resources. The user space comprises application operating on top of the operating system. The kernel space comprises drivers operating at the operating system level. In an embodiment, system calls are used to communicate instructions between a user space and a kernel space. Examples of system resources include, but are not limited to, operating system resources and device drivers. Providing operating system (OS)-isolation between user space 118 and kernel space 120 may provide protection in case kernel space 120 is compromised by malicious instructions. User space 118 comprises one or more applications 122. Applications 122 may be client-facing applications capable of being accessed by a client over a network (e.g. the Internet). Applications 122 are executed in user space 118 to prevent public access to the operating system and system resources.

Kernel space 120 comprises hypervisor control points 124 and virtual machine measurement points 126. Hypervisor control points 124 and virtual machine measurement points 126 may be configured to operate in the kernel space 120 to protect hypervisor control points 124 and virtual machine measurement points 126 from being compromised by malicious instructions operating in the user space 120. Operating in the user space 120 also allows hypervisor control points 124 and virtual machine measurement points 126 to monitor and collect data from a guest virtual machine 104 without being detected or known to applications 122 operating in the user space 120. Hypervisor control points 124 and virtual machine measurement points 126 may be software or firmware (e.g. drivers) that is executed in hardware (e.g. one or more processors). Hypervisor control points 124 are executed in kernel space 120 to employ virtual machine measurement points 126 to extract virtual machine operating characteristics metadata from guest virtual machines 104 and/or hypervisor 102. For example, hypervisor control points 124 may operate inside the operating system of guest virtual machines 104. In an embodiment, hypervisor control points 124 is configured to be implemented on or executed by a dedicated or separate core than the cores used for resources for the guest virtual machine 104. Additional information for implementing hypervisor control points 124 on a dedicated core is described in FIG. 5. Hypervisor control points 124 are configured to monitor system calls from applications 122 between user space 118 and kernel space 120.

Hypervisor control points 124 are configured to receive virtual machine operating characteristics metadata gathered by virtual machine measurement points 126 and to forward at least a portion of the virtual machine operating characteristics metadata to controller connections 116 of hypervisor 102. Information collected by virtual machine measurement points 126 may be used for detecting malicious instructions that are executing on guest virtual machine 104. Information collected by virtual machine measurement points 126 may include, but is not limited to, file names, file hashes, Internet Protocol (IP) addresses, Uniform Resource Locators (URLs), executable files, system calls/returns, an operating system environment hash, file encryption algorithms, process trees or lists, memory maps, kernel modules, application program interface (API) hooks, file change or modification time information, metadata, memory footprints, stream processing unit (SPU) usage, and network usage. In an embodiment, virtual machine measurement points 126 are software instructions that are executed on guest virtual machine 104 and may be executed such that the components and applications 122 of the guest virtual machine 104 are not interrupted by measurements being taken. Hypervisor control points 124 may be configured to be filtered, encrypted, and/or packetize the virtual machine operating characteristics metadata and send the virtual machine operating characteristics metadata to hypervisor 102 using hypervisor connecting interface 152. Hypervisor control points 124 may be configured to receive virtual machine operating characteristics metadata continuously, at predetermined time intervals, or in response to a request (e.g. measurement request).

Virtual machine measurement points 126 are configured to monitor physical and/or virtual hardware of guest virtual machines 104, to measure metadata for operating characteristics metadata of the hardware, and to send virtual machine operating characteristics metadata to hypervisor control points 124. Virtual machine measurement points 126 may be configured to transform the metadata from machine language to a human readable language or format. Virtual machine measurement points 126 may extract virtual machine operating characteristics metadata from user space 118 and/or kernel space 120 of guest virtual machines 104. Virtual machine measurement points 126 may be dynamically created or removed from guest virtual machine 104. For example, virtual machine measurement points 126 may be created in response to a measurement request.

In one embodiment, virtual machine measurement points 126 may be configured to perform volatile memory extractions from a guest virtual machine 104. For example, virtual machine measurement points 126 may be configured to scroll through system pages and to extract one or more memory pages or page tables from a memory to be analyzed for malicious instructions. The memory page or page table may comprise information about currently executing processes or applications.

In another embodiment, virtual machine measurement points 126 may be configured to capture data for network traffic introspection. Virtual machine measurement points 126 may monitor virtualized network interface cards (VNICs), VXLAN, Vswitches, and/or any other network devices to monitor inbound and outbound network traffic. Virtual machine measurement point 126 may monitor network traffic or activity at different granularity levels. For example, virtual machine measurement points 126 may perform fine grain network monitoring via a guest VNIC or may perform network monitoring on a larger scale via VXLANS and Vswitches. Virtual machine measurement points 126 may be able to detect known threats, for example, based on known IP addresses and ports, and to block traffic for the known threats.

In another embodiment, virtual machine measurement points 126 may be configured to capture data from event logging. For example, virtual machine measurement points 126 may be configured to capture data about log file events or network events.

In another embodiment, virtual machine measurement points 126 may be configured to provide file management security. For example, virtual machine measurement points 126 may be configured to kill or terminate applications 122, for example, applications 122 with malicious instructions, based on known malware hashes. Alternatively, virtual machine measurement points 126 may be configured to capture any other data as would be appreciated by one of ordinary skill in the art upon viewing this disclosure. An example of a guest virtual machine 104 is described in FIG. 4.

Virtual vault machine 106 may be employed to perform threat analysis of guest virtual machines 104 in a virtual network and may be reliably clean of any malicious instructions. To help ensure that virtual vault machine 106 is free of malicious instructions, virtual vault machine 106 may be isolated from portions of the virtual network that are less secure against malicious instructions such as guest virtual machines 104. In an embodiment, a separate software defined perimeter may be created and used only by the virtual vault machine 106 to provide isolation from portions of the virtual network that are less secure. Virtual vault machine 106 may be operably coupled to and configured to exchange data with hypervisor 102, trusted measurement machine 108, virtualization manager 110, vault management console 112, and/or known threat aggregator 114. Virtual vault machine 106 is configured analyze virtual machine operating characteristics metadata from guest virtual machines 104.

In certain embodiments, virtual vault machine 106 may be configured to employ machine learning algorithms to correlate or compare the behavior of guest virtual machines 104 to known malicious operating states and to known healthy operating states for guest virtual machines 104. Virtual vault machine 106 may be configured to pass threat analysis results of the virtual machine operating characteristics metadata to vault management console 112, for example, through a REST API.

A virtual vault machine 106 comprises user space 128 and kernel space 130. User space 128 is configured to perform threat analyses and comprises analysis tool 132 and hypervisor device driver interface 134. Analysis tool 132 and hypervisor device driver interface 134 may be software or firmware that is executed in hardware (e.g. one or more processors). Analysis tool 132 may be configured to receive virtual machine operating characteristics metadata from hypervisor device driver interface 134 and to employ machine learning algorithms to detect evidence of malicious instructions in the virtual machine operating characteristics. Analysis tool 132 may employ machine learning algorithms to correlate guest virtual machines 104 with known configurations of other guest virtual machines 104 to classify guest virtual machines 104 based on the received virtual machine operating characteristics. For example, a machine learning algorithm may classify a guest virtual machine 104 as healthy, compromised, or unknown based on virtual machine operating characteristics metadata associated with the guest virtual machine 104. Analysis tool 132 may be configured to classify guest virtual machines 104 by correlating or comparing virtual machine information to clusters of known healthy virtual machine operating characteristics metadata and known compromised virtual machine characteristics. Analysis tool 132 may also classify guest virtual machine 104 based on information from known threat aggregator 114, such as, information about known threats and their system footprints, information from a database (not shown) that stores previously classified virtual machine operating characteristics, and/or semantic analysis results from trusted measurement machine 108. Analysis tool 132 is also configured to send analysis results (e.g. a determined classification) to vault management console 112. For example, the analysis results may comprise at least a portion of the virtual machine operating characteristics metadata and the determined classification.

In one embodiment, a machine learning algorithm is a clustering algorithm or a modified clustering algorithm (e.g. a k-mean clustering algorithm) that attempts to correlate or "fit" virtual machine operating characteristics metadata to either a healthy cluster of known guest virtual machines or a compromised cluster of known guest virtual machines. Analysis tool 132 may process virtual machine operating characteristics metadata by weighing each characteristic based on its relative importance in the detection of malicious instructions or of a healthy operating state to generate weighted virtual machine operating characteristics.

As an example, a correlation between cursor movements and instructions from a mouse driver may be weighted more strongly for detecting malicious instructions than a correlation between text input into an input box and instructions from a keyboard driver, which may be indicative of a copy-paste operation rather than malicious instructions. Analysis tool 132 may classify the weighted virtual machine operating characteristics metadata into a cluster. Analysis tool 132 may classify weighted virtual machine operating characteristics metadata as unknown when a classification threshold is not met. A classification threshold may be a predetermined threshold or a dynamically determined threshold. For example, analysis tool 132 may determine the classification threshold based on information from a database and known threat aggregator 114. As another example, analysis tool 132 may determine the classification threshold based on information from a database, trusted measurement machine 108, known threat aggregator 114, and a threshold sensitivity parameter determined by and/or received from vault management console 112.

Hypervisor device driver interface 134 may be configured to receive virtual machine operating characteristics metadata from hypervisor device driver 136 and to provide the virtual machine operating characteristics metadata for analysis tool 132 for analysis. Hypervisor device driver interface 134 may employ system calls to communicate data between analysis tool 132 and hypervisor device driver 136.

Kernel space 130 comprises hypervisor device driver 136. Hypervisor device driver 136 may be software or firmware that is executed in hardware. Hypervisor device driver 136 is configured to communicate virtual machine operating characteristics metadata between hypervisor device driver interface 134 and hypervisor 102 using secure virtual network connection 150. Hypervisor device driver 136 may be configured to decrypt virtual machine operating characteristics metadata and/or to compile the virtual machine operating characteristics metadata into a form or format suitable for analyzing guest virtual machines 104. Hypervisor device driver 136 may be configured to convert the virtual machine operating characteristics metadata into a data structure (e.g. an array) or a data file, such as, an extensible markup language (XML) file or JavaScript object notation (JSON) file, based on a requested format. The virtual machine operating characteristics metadata may also be organized to allow analysis tool 132 to efficiently analyze a guest virtual machine 104.

Trusted measurement machine 108 may be isolated from the public facing virtual network including guest virtual machines 104 to help ensure that trusted measurement machine 108 is free of malicious instructions. Trusted measurement machine 108 may be configured analyze guest virtual machine 104 behavior and characteristics to detect malicious instructions. Trusted measurement machine 108 is configured to receive virtual machine operating characteristics metadata from virtual vault machine 106. In one embodiment, trusted measurement machine 108 is configured to receive virtual machine operating characteristics metadata from the virtual vault machine 106 via virtual management console 112. In another embodiment, trusted measurement machine 108 is configured to receive virtual machine operating characteristics metadata directly from virtual vault machine 106.

Trusted measurement machine 108 is configured to process the virtual machine operating characteristics metadata and to create a target profile for each guest virtual machines 104 and their respective virtual machine operating characteristics. A target profile may comprise a repository of measurements which may be used to determine a current state of a guest virtual machine 104. The current state (e.g. healthy or compromised) of a guest virtual machine 104 may be used to in the determination of whether a particular guest virtual machine 104 is trusted or untrusted. For example, trusted measurement machine 108 may use the current state of a guest virtual machine 106 to determine whether the virtual machine operating characteristics metadata of the guest virtual machine 104 matches expected measurements obtained by the trusted measurement machine 108. Comparing virtual machine operating characteristics metadata from a guest virtual machine 104 to expected measurements may allow a trusted measurement machine 108 to detect malicious instructions that are designed to bypass the threat analysis of virtual vault machines 106 by acting like a known and trusted process.

Trusted measurement machine 108 comprises user space 138 and kernel space 140. User space 138 comprises profiling tool 142 and sematic virtual machine profiling engine interface 144. Profiling tool 142 and sematic virtual machine profiling engine interface 144 may be software or firmware that is executed in hardware (e.g. one or more processors). Profiling tool 142 is configured to compile information associated with virtual machine operating characteristics metadata from known threat aggregator 114, virtual vault machine 106, and/or a database (not shown) for initiating a semantic analysis of data measured from guest virtual machine 104, to send the compiled information to semantic virtual machine profiling engine 146 via semantic virtual machine profiling engine interface 144, and to receive a target profile in response to sending the complied information.

Target profiles may comprise known configurations for guest virtual machines 104. Known configurations may comprise known healthy configuration and/or known compromised configurations. A target profile may aid in the detection of obfuscated malicious instructions. Malicious instructions may disguise themselves as legitimate applications 122 on a guest virtual machine 104 when executed. A target profile may comprise application execution information to compare with the execution of an application 122 in a trusted environment. Examples of application execution information include, but are not limited to, an operating system environment has, file encryption algorithms, file names, process trees or lists, memory maps, kernel modules, API hooks, file change or modification time information, metadata, system calls/returns, memory footprints, SPU usage, central processing unit (CPU) usage, and network usage. Profiling tool 142 may be configured to perform a comparative analysis using the target profile to determine whether a guest virtual machine 104 is compromised by obfuscated malicious instructions. Profiling tool 142 may be configured to forward comparison results to virtual vault machine 106 and/or vault management console 112. In one embodiment, profiling tool 142 may be configured to store the virtual machine operating characteristics metadata and/or the determined classification, for example, in a memory or database (not shown).

Semantic virtual machine profiling engine interface 144 is configured to receive virtual machine operating characteristics metadata and target profile requests from profiling tool 142. Semantics virtual machine profiling engine interface 144 is also configured to receive target profile requests and information from vault management console 112 and known threat aggregator 114. For example, the semantics virtual machine profiling engine interface 144 may be configured to send the target profile requests to semantic virtual machine profiling engine 146 in the kernel space 140, and to send target profiles to the profiling tool 142 and/or to vault management console 112.

Kernel space 140 comprises semantic virtual machine profiling engine 146. Semantic virtual machine profiling engine 146 may be software or firmware that is executed in hardware (e.g. one or more processors). Semantic virtual machine profiling engine 146 is configured to receive target profile requests from semantic virtual machine profiling interface 144 to conduct measurements and to forward target profiles to semantic virtual machine profiling engine interface 144. Measurements conducted by semantic virtual machine profiling engine 146 may produce target profiles that comprise trusted virtual machine operating characteristics metadata that may be compared to virtual machine operating characteristics metadata of a potentially compromised guest virtual machine 104. In some embodiments, a comparison between trusted virtual machine operating characteristics metadata and untrusted virtual machine operating characteristics metadata may expose malicious instructions that attempt to disguise themselves as known applications 122. In one embodiment, the comparison of trusted virtual machine operating characteristics metadata and untrusted virtual machine operating characteristics metadata may be conducted by semantic virtual machine profiling engine 146. In another embodiment, trusted measurement machine 108 may forward trusted virtual machine operating characteristics metadata to vault management console 112 for comparison and analysis.

Semantic virtual machine profiling engine 146 is also configured to receive compiled information from profiling tool 142, to analyze the compiled information (e.g. virtual machine operating characteristics metadata), to create a target profile based on the compiled information, and to send the target profile to profiling tool 142 via semantic virtual machine interface 144. An example of a trusted measurement machine 108 is described in FIG. 3.

Virtualization manager 110 is configured to configure various components of the detection system 100 such as hypervisor 102 and/or guest virtual machines 104. For example, virtualization manager 110 may configure guest virtual machines 104 so that hypervisor control points 124 and virtual machine measurement points 126 are isolated from a compromised operating system.

Vault management console 112 is configured to manage virtual vault machine 106 and trusted measurement machine 108, to send measurement requests, and to forward threat analysis information from known threats aggregator 114 to virtual vault machine 106 and/or to trusted measurement machine 108. Vault management console 112 may also be configured to send measurement requests for periodic metadata measurements of virtual machine operating characteristics metadata to be taken at a guest virtual machine 104. A measurement request may comprise a list of requested virtual machine operating characteristics metadata, durations for collecting the requested virtual machine operating characteristics metadata, and/or a preferred format for the virtual machine operating characteristics. For example, vault management console 112 may be configured to send measurement requests to hypervisor 102 via virtual vault machine 106 or virtualization manager 110. Measurement requests for a guest virtual machine 104 may be sent in response to a timer expiring, a detection system 100 metric exceeding a threshold, a user request, an analysis of prior measurements that prompt further investigation, or any other stimulus as would be appreciated by one of ordinary skill in the art upon viewing this disclosure. In an embodiment, vault management console 112 may generate measurement requests that target specific virtual machine operating characteristics metadata and virtual machine measurement points 126 based on known indicators.

Known threats aggregator 114 is configured to derive and/or to provide known threat information about known malicious instructions to trusted measurement machine 108 and virtual vault machine 106. Known threats aggregator 114 may be configured to provide known threat information to trusted measurement machine 108 and/or virtual vault machine 106 to train their respective learning algorithms for analyzing guest virtual machines 104. For example, known threats aggregator 114 may be configured to provide clusters of known healthy configurations and/or known compromised configurations for guest virtual machines 104. In an embodiment, known threats aggregator 114 may be configured to provide known threat information in response to receiving a request for known threat information from trusted measurement machine 108 and/or virtual vault machine 106. For example, a known threat information request may comprise a request for known threat information including healthy memory footprints and compromised memory footprints for a guest virtual machine 104.

In operation, vault management console 112 may transmit a measurement request that requests virtual machine operating characteristics metadata from a guest virtual machine 104 to hypervisor 102. Hypervisor 102 identifies a guest virtual machine 104 based on the request and sends the measurement request that comprises a list of requested virtual machine operating characteristics metadata to hypervisor control points 124 in the identified guest virtual machine 104. Hypervisor control points 124 receives the measurement request, selects one or more corresponding virtual machine measurement points 126 based on the requested virtual machine operating characteristics, and sends at least a portion of the information from the measurement request to the selected virtual machine measurement points 126.

As an example, the measurement request may request virtual machine operating characteristics metadata of a memory page that corresponds to virtual memory allocated to a known and trusted application 122. Application 122 may actually be malicious instructions masquerading as application 122. Malicious instructions may be unable to hide the signature they produce in the virtual memory and the memory page that is retrieved by virtual machine measurement points 126.

The received memory page is sent to hypervisor control points 124 comprises the malicious instruction signature. Hypervisor control point 124 forwards the memory page that comprises the malicious instruction signature with other virtual machine operating characteristics metadata to hypervisor 102. In an embodiment, hypervisor control points 124 bundles the memory page together with other virtual machine operating characteristics, encrypts the virtual machine operating characteristics, and sends the virtual machine operating characteristics metadata via hypervisor 102. In another embodiment, hypervisor 102 bundles the memory page together with other virtual machine operating characteristics, encrypts the virtual machine operating characteristics, and sends the virtual machine operating characteristics metadata using secure virtual network connection 150.

Virtual vault machine 106 receives virtual machine operating characteristics metadata from hypervisor 102, decrypts the virtual machine operating characteristics, and removes any unnecessary data to generate filtered virtual machine operating characteristics. In one embodiment, virtual vault machine 106 sends the filtered virtual machine operating characteristics metadata that comprises the memory page with the malicious instructions signature to trusted measurement machine 108 for a semantics analysis. Trusted measurement machine 108 may use the filtered virtual machine operating characteristics metadata to create a target profile that comprises information about operating states of applications 122. Trusted measurement machine 108 requests known threat information from known threat aggregator 114 based on the target profile. Known threat aggregator 114 may comprise virtual machine operating characteristics metadata for guest virtual machines 104 that are known to be healthy and for guest virtual machines 104 that are known to be compromised. Known threat aggregator 114 sends known threat information for known healthy guest virtual machines 104 and known compromised guest virtual machines 104 based on the target profile to trusted measurement machine 108. As an example, the information from known threat aggregator 114 may comprise memory pages from applications 122 on a healthy system and memory pages from applications 122 on a compromised system. Trusted measurement machine 108 may use the known threat information to determine whether a guest virtual machine 104 is compromised.

In an embodiment, trusted measurement machine 108 uses a machine learning algorithm to find a strong correlation between virtual machine operating characteristics metadata or the guest virtual machine 104 and the known threat information from a comprised machine and to determine that the guest virtual machine 104 is compromised. Trusted measurement machine 108 sends the results of the semantics analysis to the virtual vault machine 106 with a determination that the guest virtual machine 104 that corresponds with the virtual machine operating characteristics metadata is compromised.

In another embodiment, virtual vault machine 106 may send the virtual machine operating characteristics metadata that comprises the memory page with the malicious instructions signature to known threat aggregator 114. Virtual vault machine 106 may analyze the virtual machine operating characteristics metadata to identify signatures of malicious instructions that may differ from the malicious instructions being obfuscating as application 122. Virtual vault machine 106 may determine that application 122 is compromised based on known threat information from known threat aggregator 114, results from trusted measurement machine 108, and/or results from analysis tool 132.

Virtual vault machine 106 sends the virtual machine operating characteristics metadata and the determination that the guest virtual machine 104 is compromised to vault management console 112 and/or known threat aggregator 114. In an embodiment, vault management console 112 may notify a security administrator of the compromised guest virtual machine 104 and/or may take automatic actions to isolate and remedy the compromised guest virtual machine 104. Known threat aggregator 114 may add the virtual machine operating characteristics metadata and the determination to the known threat information for future use in detecting malicious instructions.

Figure 2:
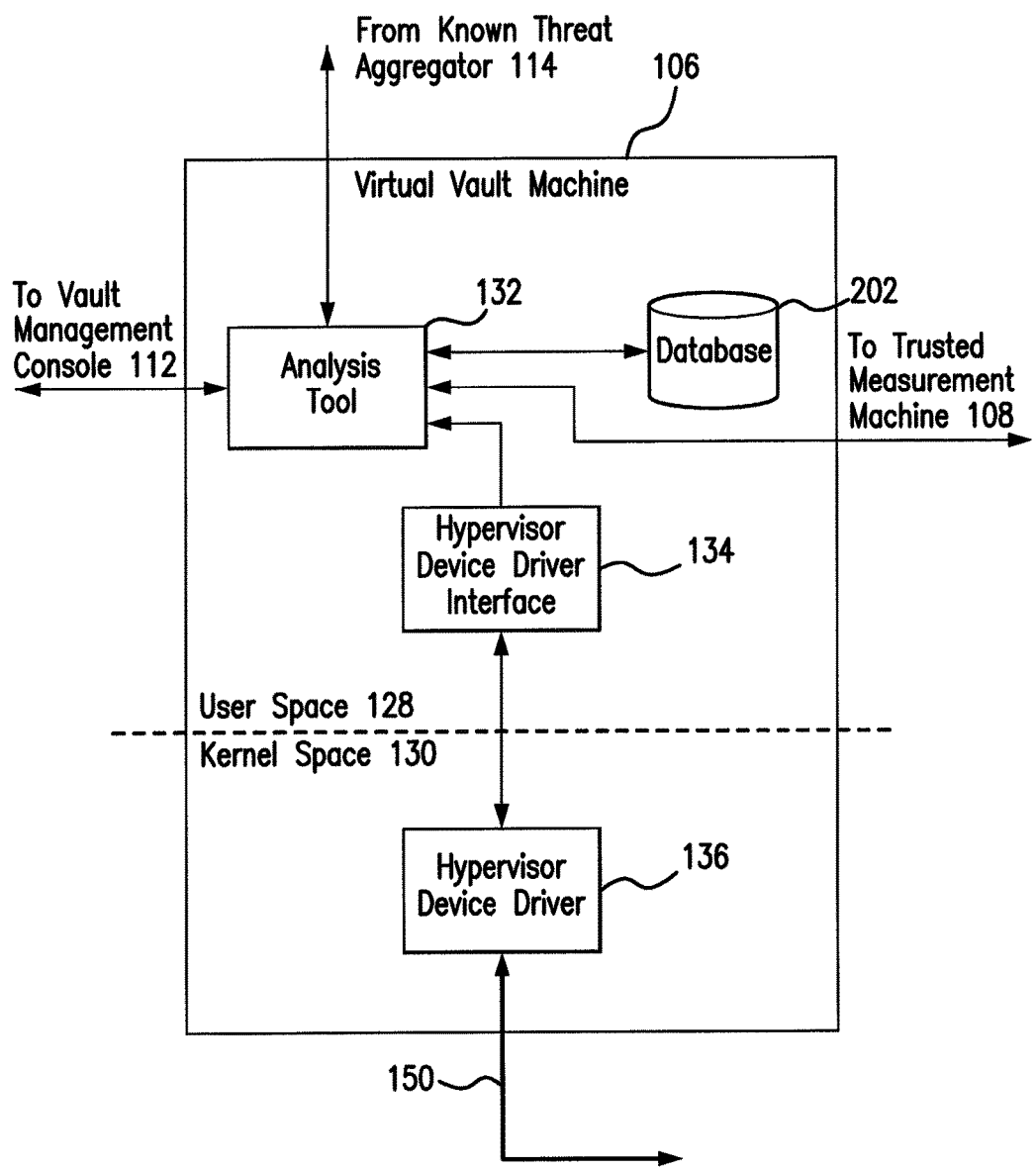
FIG. 2 is a schematic diagram of an embodiment of a virtual vault machine of a detection system.

FIG. 2 is a schematic diagram of an embodiment of a virtual vault machine 106 of a detection system 100. Virtual vault machine 106 is configured to receive virtual machine operating characteristics metadata at hypervisor device driver 136 from hypervisor 102 using secure virtual network connection 150. Upon receiving virtual machine operating characteristics, hypervisor device driver 136 is configured to filter the virtual machine operating characteristics metadata for analysis and forwards the filtered virtual machine operating characteristics metadata to hypervisor device driver 134. Hypervisor device driver 134 is configured to receive the virtual machine operating characteristics metadata and to forward the virtual machine operating characteristics metadata to analysis tool 132.

Analysis tool 132 may be configured to receive information from known threat aggregator 114 and database 202 and to analyze the virtual machine operating characteristics metadata to classify a guest virtual machine 104 that is associated with the virtual machine operating characteristics. Database 202 may be a memory. Although FIG. 2 shows database 202 as being incorporated within virtual vault machine 106, database 202 may be a memory that is external to virtual vault machine 106. Analysis tool 132 is configured to forward portions of the virtual machine operating characteristics metadata to trusted measurement machine 108 for a semantic analysis. Analysis tool 132 is also configured to send analysis results (e.g. a classification) to vault management console 112 following the classification of the guest virtual machine 104 that is associated with the virtual machine operating characteristics.

Figure 3:
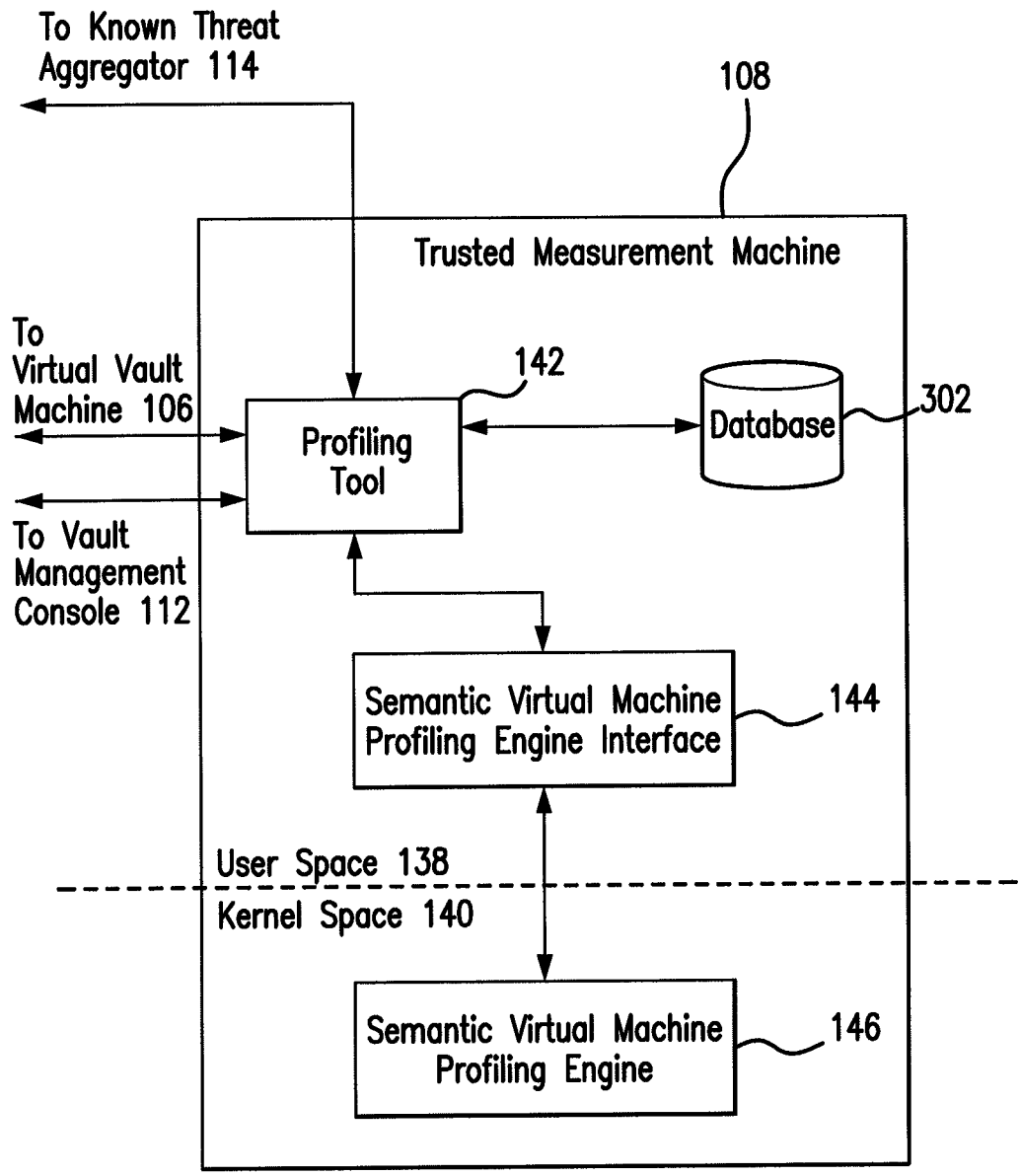
FIG. 3 is a schematic diagram of an embodiment of a trusted measurement machine of a detection system.

FIG. 3 is a schematic diagram of an embodiment of a trusted measurement machine 108 of a detection system 100. Trusted measurement machine 108 is configured to receive a portion of the virtual machine operating characteristics metadata from a virtual vault machine 106 for a semantic analysis at profiling tool 142. Trusted measurement machine 108 is also configured to store generate and store target profiles for guest virtual machines 104. Profiling tool 142 is configured to receive information from virtual vault machine 106, known threat aggregator 114, and database 302. Database 302 may be a memory. Although FIG. 3 shows database 302 as being incorporated within trusted measurement machine 108, database 302 may be a memory that is external to trusted measurement machine 108. Profiling tool 142 is also configured to send target profile requests to semantic virtual machine profiling engine 146, and to receive target profiles from semantic virtual machine profiling engine 146 via semantic virtual machine profiling engine interface 144.

Figure 4:
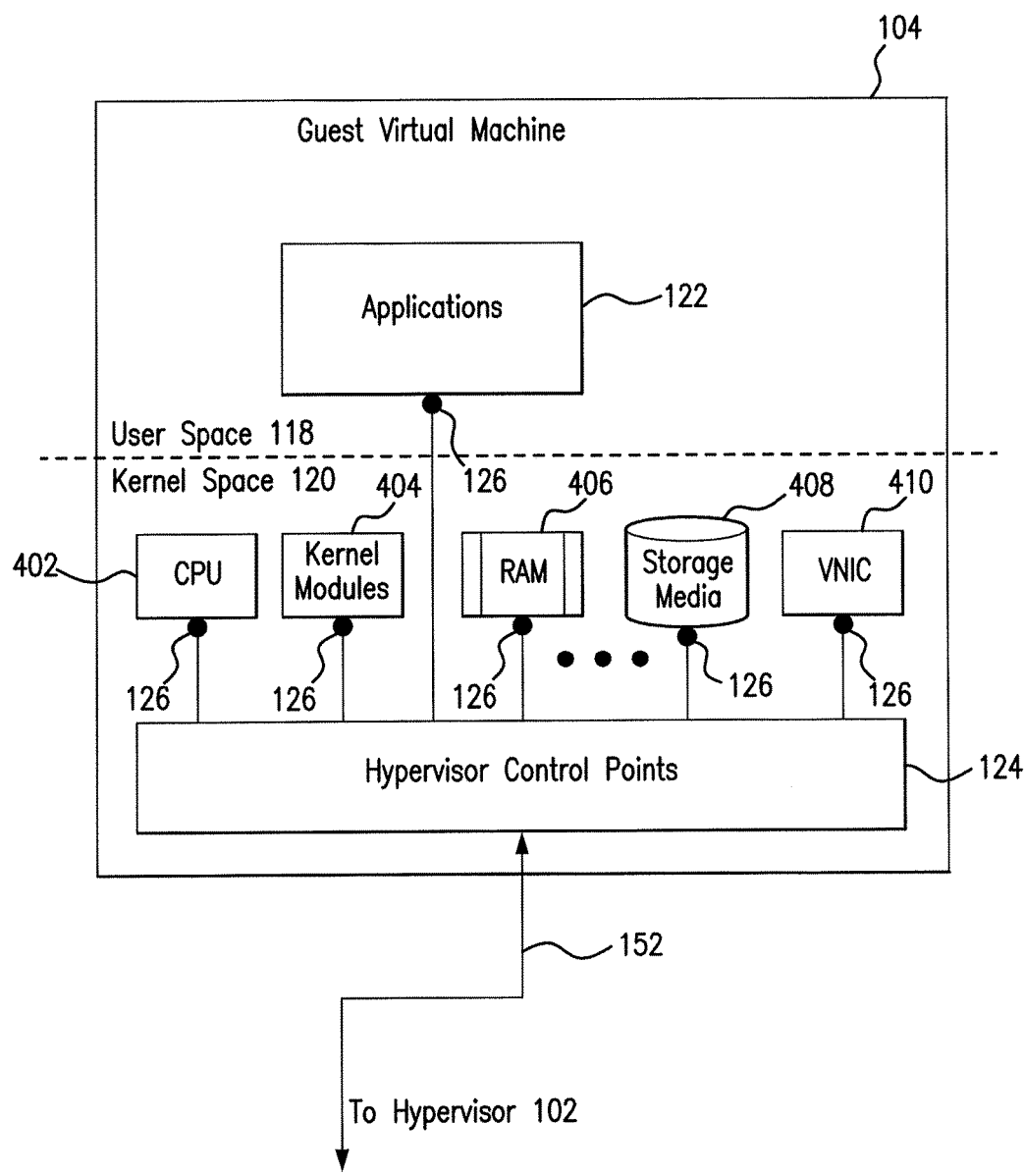
FIG. 4 is a schematic diagram of an embodiment of a guest virtual machine of a detection system.

FIG. 4 is a schematic diagram of an embodiment of a guest virtual machine 104 of a detection system 100. Guest virtual machine 104 comprises CPU 402, kernel modules 404, RAM 406, storage media 408, and VNIC 410. Guest virtual machine 104 may be configured as shown or in any other suitable configuration. CPU 402, kernel modules 404, RAM 406, storage media 408, and VNIC 410 may be physical devices or virtualized components that are configured to behave like physical devices. For example, RAM 406 may comprise virtual memory addresses 0x0000 to 0xFFFF, which may correspond to addresses 0x002A0002 to 0x002B0001 in physical memory.

Hypervisor control points 124 may be implemented or executed on a core that is held separate from other cores that are available to guest virtual machine 104. Isolating hypervisor control points 124 on a separate core may provide OS-isolation which may increase security for hypervisor control points 124 and may reduce the likelihood of hypervisor control points 124 being compromised by malicious instructions, codes, or files. An example of isolating hypervisor control points 124 on a separate core is described in FIG. 5. Hypervisor control points 124 is configured to receive data from virtual machine measurement points 126 that are connected to the CPU 402, kernel modules 404, RAM 406, storage media 408, VNIC 410, and/or other devices of interest in guest virtual machine 104. Virtual machine measurement points 126 are configured to collect virtual machine operating characteristics metadata from their respective components and to forward the collected virtual machine operating characteristics metadata to hypervisor control points 124. Hypervisor control points 124 are configured to forward the virtual machine operating characteristics metadata to hypervisor 102 via hypervisor connecting interface 152.

Figure 5:
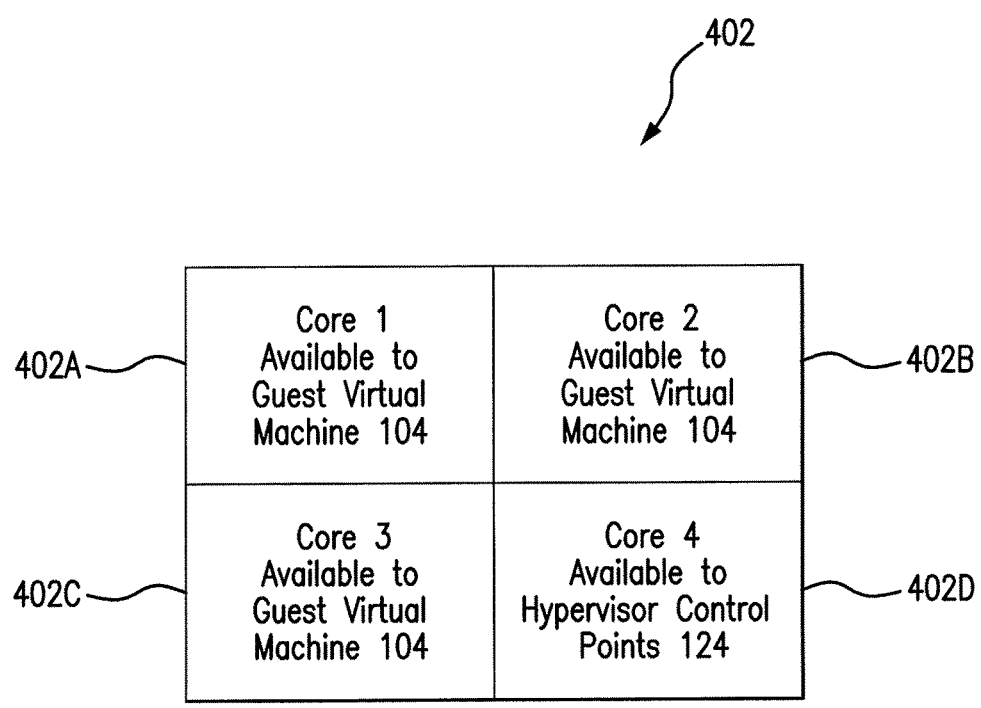
FIG. 5 is a schematic diagram of an embodiment of a central processing unit (CPU) for a guest virtual machine with multiple cores.

FIG. 5 is a schematic diagram of an embodiment of a CPU 402 for a guest virtual machine 104 with multiple cores 402A, 402B, 402C, and 402D. In an embodiment, CPU 402 may be a virtual CPU and the schematic representation may not directly correlate with the physical representation on a physical CPU. Although FIG. 5 illustrates CPU 402 with four cores 402A-402D (i.e. a quad-core CPU), any suitable number of cores and/or configuration may be employed as would be appreciated by one of ordinary skill in the art upon viewing this disclosure. In one embodiment, cores 402A-402D may be virtualized such that they are reserved cores on a physical CPU. In another embodiment, cores 402A-402D is virtualized such that they may be executed dynamically on one or more cores of a physical CPU based on a virtualization algorithm. Cores 402A-402D may be configured with complete separation as shown in FIG. 5 or may be configured to share physical and/or virtual resources of CPU 402 such as caches, ALUs, and registers.

Guest virtual machines 104 may be able to view and/or control all of the available cores (e.g. cores 402A-402D) or a subset of the available cores of CPU 402. In an embodiment, one or more cores 402A-402D may be OS-isolated from guest virtual machines 104 and dedicated to hypervisor control points 124 and/or virtual machine operating points 126. For example, cores 402A-402C may be configured to be available and accessible to a guest virtual machine 104 and core 402D may be OS-isolated from the guest virtual machine 104 and reserved for hypervisor control points 124 and/or virtual machine operating points 126. In an embodiment, a core that is reserved for hypervisor control points 124 may be connected to a different virtual network interface card than the guest virtual machine 104, which may allow hypervisor control points 124 to receive network traffic without the guest virtual machine 104 being aware of it.

Malicious instructions may infect a guest virtual machine 104 and may obfuscate themselves by identifying themselves to an operating system as a known and trusted application 122. In order to detect these types of malicious instructions, hypervisor control points 124 are isolated from the operating system by executing on core 402D. Core 402D is not visible to the operating system on a compromised guest virtual machine 104. Hypervisor control points 124 executing on core 402D may have full access to the system resources and operating data of guest virtual machine 104.

Figure 6:
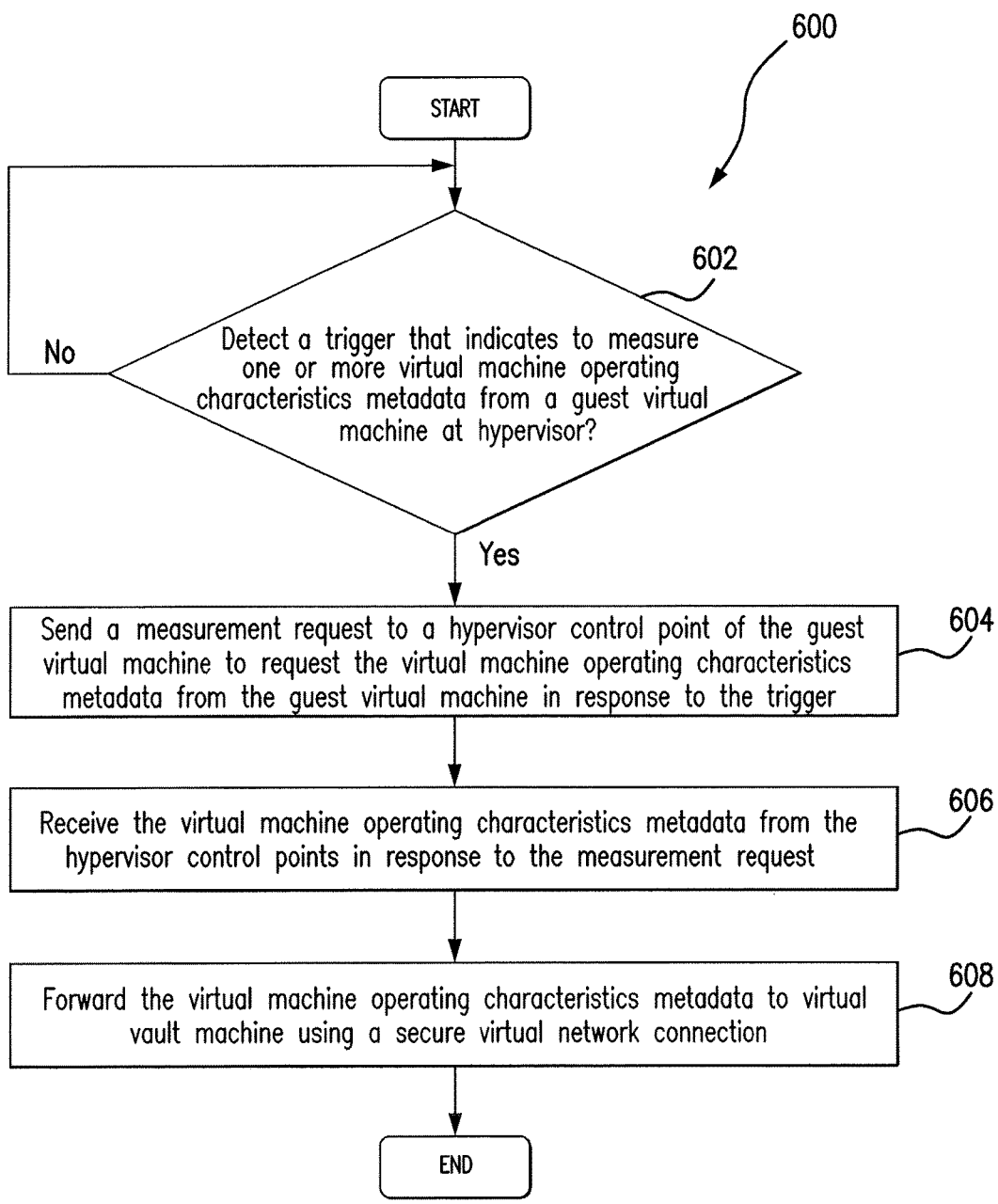
FIG. 6 is a flowchart of an embodiment of a method for requesting measurements from guest virtual machine.

FIG. 6 is a flowchart of an embodiment of a method 600 for requesting virtual machine operating characteristics metadata measurements from guest virtual machine 104. Method 600 may be implemented by hypervisor 102 to request and obtain virtual machine operating characteristics metadata from a guest virtual machine 104 for analysis by a virtual vault machine 106, for example, to determine the health of the guest virtual machine 104.

At step 602, hypervisor 102 determines whether a trigger is detected that indicates to measure virtual machine operating characteristics metadata on a guest virtual machine 104. In an embodiment, hypervisor 102 may originate the trigger. For example, hypervisor 102 may originate the trigger based on satisfied criteria such as time elapsed or a particular network pattern. In another embodiment, vault management console 112 may originate the trigger and send to the trigger to hypervisor 102 via virtual vault machine 106. Vault management console 112 may originate the trigger based on detecting suspicious network behavior, analysis results from virtual vault machine 106 or trusted measurement machine 108, and/or in response to information from known threat aggregator 114. Hypervisor 102 proceeds to step 604 when hypervisor 102 detects a trigger. Otherwise, hypervisor 102 may continue to wait and monitor for triggers.

At step 604, hypervisor 102 sends a measurement request to hypervisor control points 124 of the guest virtual machine 104 to request virtual machine operating characteristics metadata from the guest machine 104 in response to the trigger using controller connections 116. For example, hypervisor 102 may send a measurement command to controller connections 116 to request hypervisor control points 124 to obtain virtual machine operating characteristics metadata for guest virtual machine 104. The measurement command may comprise a list of requested virtual machine operating characteristics metadata, durations for collecting the requested virtual machine operating characteristics metadata, and/or a preferred format for the virtual machine operating characteristics metadata for a response to a measurement request. In an embodiment, the measurement command may comprise information that indicates to instantiate (i.e. create) a new virtual machine measurement point 126 and instructions for which virtual machine operating characteristics metadata the new virtual machine measurement point 126 will collect. In another embodiment, the measurement command may comprise a target profile that indicates instructions for detecting a specific set of malicious instructions. For example, the target profile may indicate an amount of virtual machine operating characteristics metadata to be collected. Controller connections 116 sends a measurement request to hypervisor control points 124 that indicates for the hypervisor control points 124 to initiate the collection of virtual machine operating characteristics metadata in response to receiving the measurement command from hypervisor 102. Controller connections 116 may generate the measurement request based on the information provided in the measurement command from hypervisor 102.

At step 606, hypervisor 102 receives virtual machine operating characteristics metadata from hypervisor control points 124 in response to the measurement request. For example, hypervisor 102 receives the virtual machine operating characteristics metadata via controller connections 116. The received virtual machine operating characteristics metadata comprises data that corresponds with the requested virtual machine operating characteristics metadata. In an embodiment, hypervisor control points 124 may compress virtual machine operating characteristics metadata before sending the virtual machine operating characteristics metadata to reduce the size of the information being communicated across the virtual network. Additionally or alternatively, hypervisor control points 124 may encrypt the virtual machine operating characteristics metadata before sending the virtual machine operating characteristics metadata to reduce the likelihood of malicious instructions being able to inspect and/or alter the virtual machine operating characteristics metadata before they are received by controller connection 116. In an embodiment, hypervisor control points 124 may encrypt the virtual machine operating characteristics metadata as a payload of a packet without an address header or address information (e.g. a source address and a destination address). The virtual machine operating characteristics metadata may be encrypted such that controller connections 116 and hypervisor 102 are unable to decrypt and inspect the virtual machine operating characteristics metadata. Controller connection 116 forwards the virtual machine operating characteristics metadata to hypervisor 102 in response to receiving the virtual machine operating characteristics metadata from hypervisor control points 124.

At step 608, hypervisor 102 forwards the virtual machine operating characteristics metadata to virtual vault machine 106 using secure virtual network connection 150. In an embodiment, hypervisor 102 may filter or organize the virtual machine operating characteristics metadata to correspond with the trigger that initiated the automatic virtual machine measurement.

Figure 7:
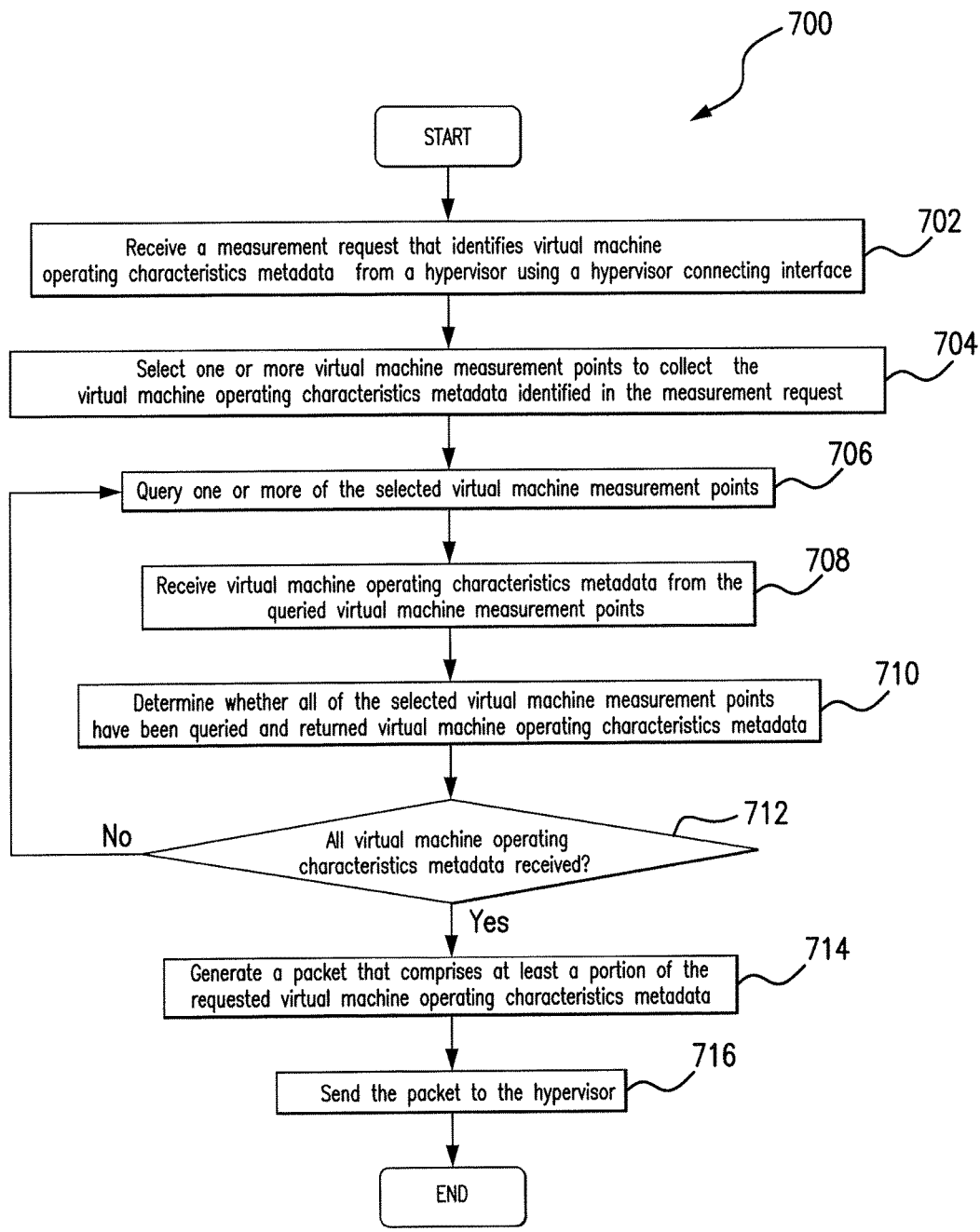
FIG. 7 is a flowchart of an embodiment of a method for measuring virtual machine characteristics on a guest virtual machine.

FIG. 7 is a flowchart of an embodiment of a method 700 for measuring virtual machine characteristics metadata on a guest virtual machine 104. Method 700 may be implemented by hypervisor control points 124 and virtual machine measurement points 126 to measure virtual machine operating characteristics metadata on a guest virtual machine 104.

At step 702, hypervisor control point 124 receives a measurement request that identifies virtual machine operating characteristics metadata from hypervisor 102 using hypervisor connecting interface 152. The measurement request may comprise a list of requested virtual machine operating characteristics metadata, instructions for obtaining the requested virtual machine operating characteristics metadata, durations for collecting the requested virtual machine operating characteristics metadata, and/or a preferred format for the virtual machine operating characteristics metadata for a response to the measurement request.

At step 704, hypervisor control point 124 selects one or more virtual machine measurement points 126 to collect the virtual machine operating characteristics metadata identified in the received measurement request.

At step 706, hypervisor control point 124 queries one or more of the selected virtual machine measurement points 126 to collect the virtual machine operating characteristics metadata. As an example, hypervisor control points 124 may query a virtual machine measurement point 126 from a plurality of selected virtual machine measurement points 126 and instructs the virtual machine measurement point 126 to measure or collect the virtual machine operating characteristic metadata. In an embodiment, hypervisor control points 124 may query and instruct a plurality of virtual machine measurement points 126 to simultaneously measure or collect the virtual machine operating characteristics metadata when multiple virtual machine operating characteristics metadata may be measured simultaneously.

At step 708, hypervisor control point 124 receives virtual machine operating characteristics metadata from the queried virtual machine measurement points 126. In an embodiment, hypervisor control points 124 may store the virtual machine operating characteristics metadata, for example, in a memory or database. Hypervisor control points 124 may store measurements directly or may store a reference or pointer that points to the measurements. Virtual machine operating characteristics metadata may be in any suitable format or data structure as would be appreciated by one of ordinary skill in the art upon viewing this disclosure.

At step 710, hypervisor control point 124 determines whether all of the selected virtual machine measurement points 126 have been queried and returned virtual machine operating characteristics metadata. In other words, the hypervisor control point 124 determines whether all of the virtual machine operating characteristics metadata has been collected.

At step 712, hypervisor control point 124 returns to step 706 in response to determining that one or more of the selected virtual machine measurement points 126 have not been queried or returned virtual machine operating characteristics metadata. Otherwise, hypervisor control points 124 proceeds to step 712 in response to determining that all of the selected virtual machine measurement points 126 have been queried and returned virtual machine operating characteristics metadata.

At step 714, hypervisor control point 124 generates a packet that comprises at least a portion of the requested virtual machine operating characteristics metadata. For example, hypervisor control point 124 may generate a packet by inserting at least a portion of the virtual guest machine operating characteristics metadata as a payload of the packet. In one embodiment, the packet may not comprise a source address and/or a destination address. In an embodiment, hypervisor control points 124 may organize the virtual machine operating characteristics metadata and discard any irrelevant virtual machine operating characteristics metadata. Hypervisor control points 124 may send the virtual machine operating characteristics metadata to a virtual network interface card to be packetized. Hypervisor control points 124 may encrypt the packet. In one embodiment, hypervisor control points 124 may encrypt the packet such that hypervisor 102 may be able to decrypt the packet. In another example, hypervisor control points 124 may encrypt the packet such that hypervisor 102 may be unable to decrypt the packet. Hypervisor control points 124 may encrypt the packet based on encryption instructions from hypervisor device driver 136. Alternatively, the hypervisor control points 124 may communicate the encryption information with the hypervisor device driver 136 to allow the hypervisor device driver 136 to decrypt the packet.

At step 716, hypervisor control point 124 sends the packet that comprises the virtual machine operating characteristics metadata to hypervisor 102 (e.g. controller connections 116) using hypervisor connecting interface 152.

Figure 8:
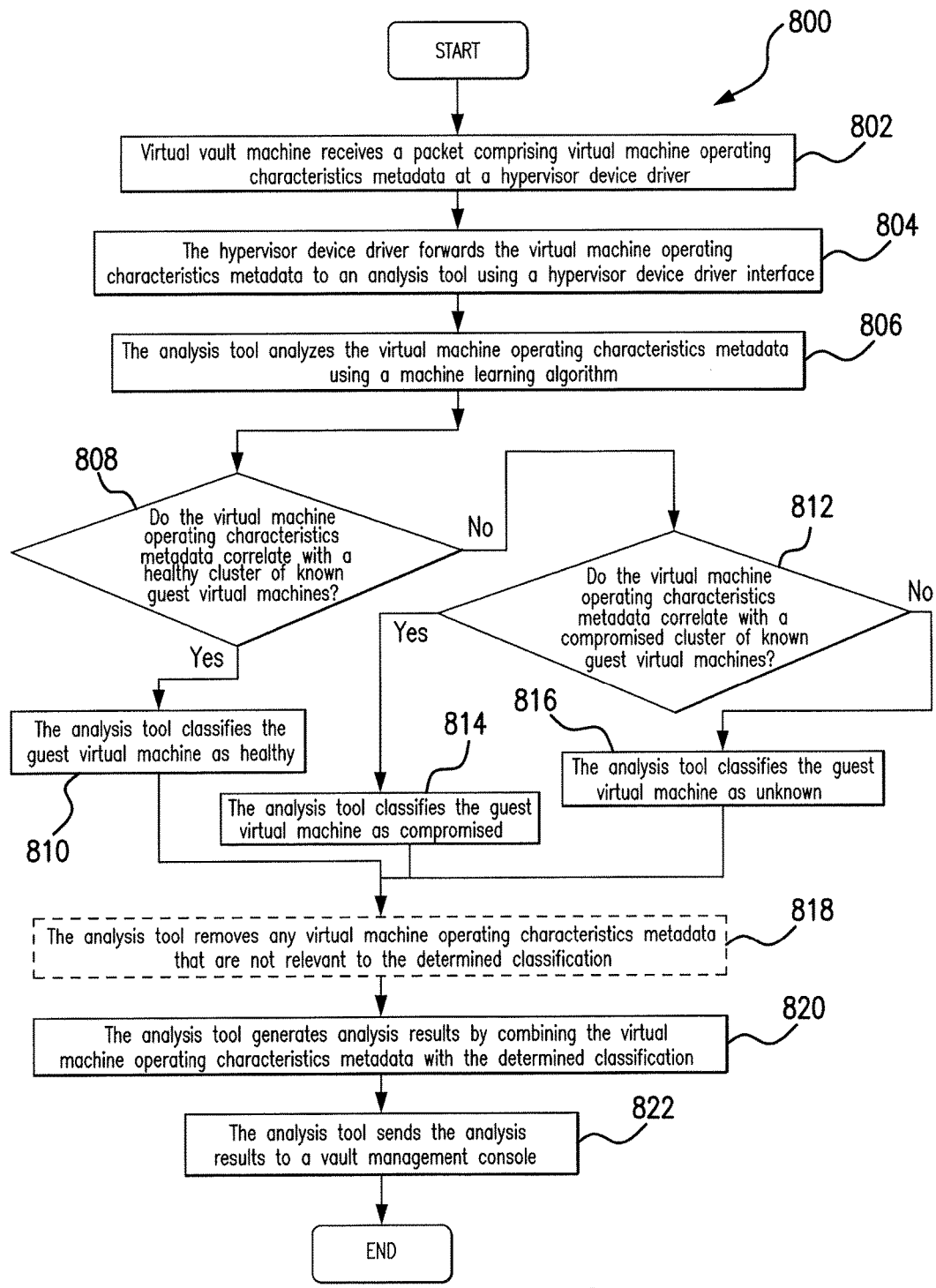
FIG. 8 is a flowchart of an embodiment of a method for analyzing virtual machine operating characteristics metadata.

FIG. 8 is a flowchart of an embodiment of a method 800 for analyzing virtual machine operating characteristics metadata. Method 800 may be implemented by virtual vault machine 106 to analyze virtual machine operating characteristics metadata of a guest virtual machine 104 for malicious instructions and/or anomalous activity, for example, to determine the health or state of a guest virtual machine 104.

At step 802, virtual vault machine 106 receives a packet comprising virtual machine operating characteristics metadata for a guest virtual machine 104 at hypervisor device driver 136 from hypervisor 102 via secure virtual network connection 150. Hypervisor device driver 136 may decrypt the virtual machine operating characteristics metadata when the virtual machine operating characteristics metadata are encrypted. In one embodiment, hypervisor device driver 136 may decrypt the virtual machine operating characteristics metadata based on encryption information that the hypervisor device driver 136 provides to hypervisor control points 124 or the hypervisor control points 124 provides to the hypervisor device driver 136.

At step 804, hypervisor device driver 136 forwards the virtual machine operating characteristics metadata to analysis tool 132 using hypervisor device driver interface 134. Forwarding the virtual machine operating characteristics metadata to hypervisor device driver interface 134 may transform the virtual machine operating characteristics metadata to allow the virtual machine operating characteristics metadata to be available in the user space 128 for analysis by analysis tool 132. For example, the hypervisor device driver 136 may convert the virtual machine operating characteristics metadata from a first format to a second format for the analysis tool 132.

At step 806, analysis tool 132 analyzes the virtual machine operating characteristics metadata using a machine learning algorithm. Analysis tool 132 may use information from known threats aggregator 114, trusted measurement machine 108, and/or database 202 with the machine learning algorithm.

At step 808, analysis tool 132 determines whether the virtual machine operating characteristics metadata correlates with a healthy cluster of known guest virtual machines. Analysis tool 132 may proceed to step 810 when analysis tool 132 determines that the virtual machine operating characteristics metadata correlates with a healthy cluster of known guest virtual machines. At step 810, analysis tool 132 classifies the guest virtual machine 104 as health or in a healthy state and proceeds to step 818.

Returning to step 808, analysis tool 132 may proceed to step 812 when analysis tool 132 determines that the virtual machine operating characteristics metadata do not correlate with a healthy cluster of known guest virtual machines. At step 812, analysis tool 132 determines whether the virtual machine operating characteristics metadata correlates with a compromised cluster of known guest virtual machines. Analysis tool 132 may proceed to step 814 when analysis tool 132 determines that the virtual machine operating characteristics metadata correlates with a compromised cluster of known guest virtual machines. At step 814, analysis tool 132 classifies the guest virtual machine 104 as compromised or in a compromised state and proceeds to step 818.

Returning to step 812, analysis tool 132 may proceed to step 816 when analysis tool 132 determines that the virtual machine operating characteristics metadata do not correlate with a compromised cluster of known guest virtual machines. At step 816, analysis tool 132 classifies the guest virtual machine 104 as unknown or in an unknown state and proceeds to step 818.

Optionally, at step 818, analysis tool 132 may remove any virtual machine operating characteristics metadata that are not relevant to the determined classification.

At step 820, analysis tool 132 generates analysis results by combing the virtual machine operating characteristics metadata with the determined classification. At step 822, analysis tool 132 sends the analysis results to vault management console 112. Alternatively, analysis tool 132 may make the analysis results available to vault management console 112, for example, via a REST API, and may only send a portion of the analysis results in response to an analysis results request from vault management console 112. In one embodiment, analysis tool 132 may compress the analysis results prior to sending the analysis results which may reduce the amount of data that is sent across the virtual network.

Figure 9:
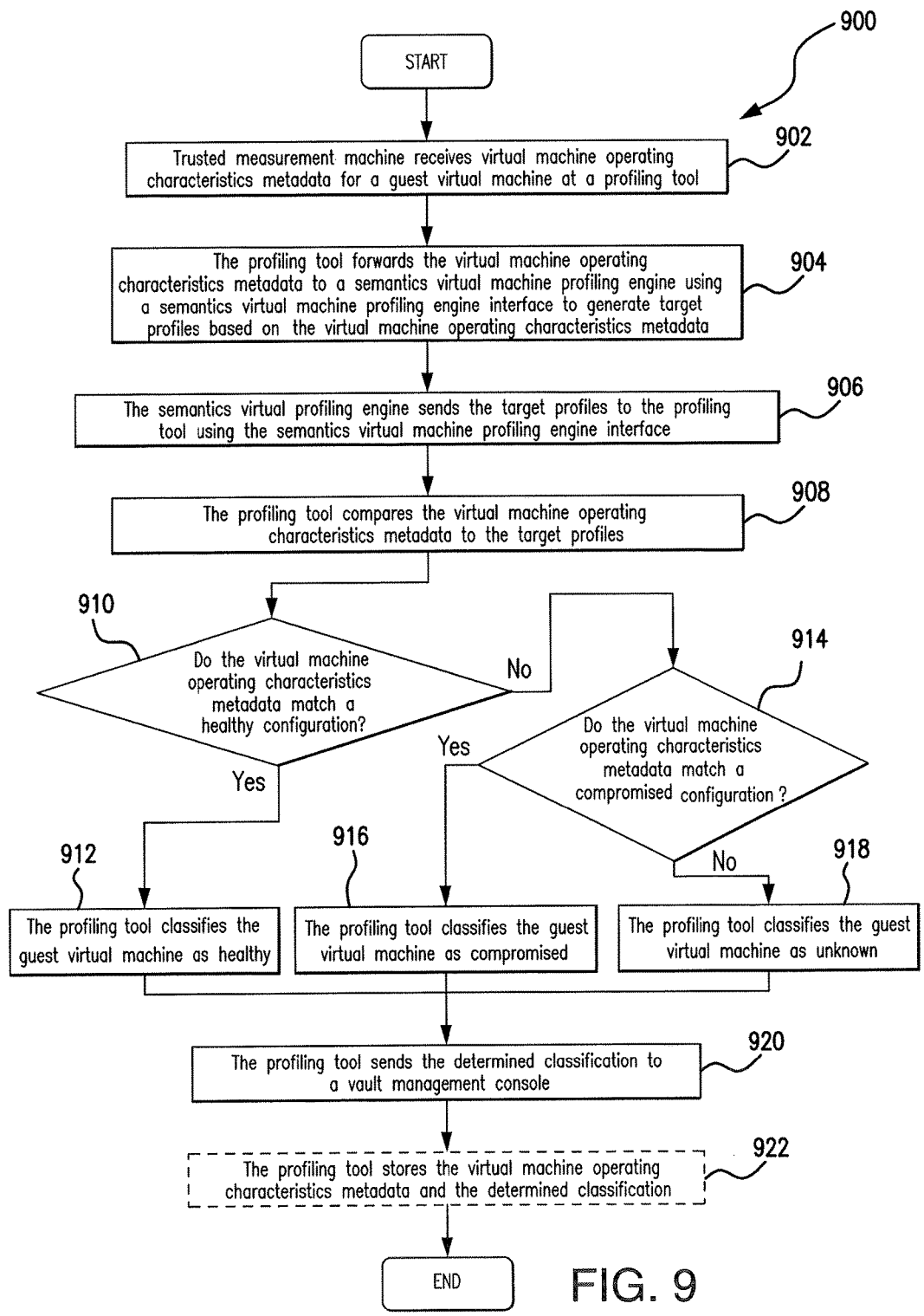
FIG. 9 is a flowchart of an embodiment of a method for comparing virtual machine operating characteristics metadata to known guest virtual machine configurations.

FIG. 9 is a flowchart of an embodiment of a method 900 for comparing virtual machine operating characteristics metadata to known guest virtual machine 104 configurations. Method 900 may be implemented by trusted measurement machine 108 to perform a comparative analysis on virtual machine operating characteristics metadata to determine the health or state of the a guest virtual machine 104. In one embodiment, analysis tool 132 may forward the virtual machine operating characteristics metadata to trusted measurement machine 108 for a comparative analysis when analysis tool 132 classifies virtual machine operating characteristics metadata as unknown or is unable to determine the health of a guest virtual machine 104.

At step 902, trusted measurement machine 108 receives virtual machine operating characteristics metadata for a guest virtual machine 104 at the profiling tool 142. Virtual machine operating characteristics metadata may be sent to trusted measurement machine 108 by vault management console 112 or virtual vault machine 106. The virtual machine operating characteristics metadata may be filtered, for example, such that information that is not relevant to a classification has been removed, or unfiltered. The virtual machine operating characteristics metadata may be organized to match the organization of the data received from known threat aggregator 114. In one embodiment, profiling tool 142 may transform or convert the virtual machine operating characteristics metadata into a form or format that is compatible with the data received from known threat aggregator 114. In an embodiment, trusted measurement machine 108 may also collect information (e.g. known threat information) from known threat aggregator 114.

At step 904, profiling tool 142 forwards the virtual machine operating characteristics metadata to semantic virtual machine profiling engine 146 using semantics virtual machine profiling engine interface 144 to generate target profiles based on the virtual machine operating characteristics. Profiling tool 142 may forward collected information and the virtual machine operating characteristics metadata to semantics virtual machine profiling engine interface 144. Semantics virtual machine profiling engine interface 144 forwards the collected information and virtual machine operating characteristics metadata from profiling tool 142 in the user space 138 of trusted measurement machine 108 to semantic virtual machine profiling engine 146 in the kernel space 140 of the trusted measurement machine 108.

At step 906, semantics virtual profiling engine 146 sends target profiles that are generated based on the collected information (e.g. known threat information) and/or the virtual machine operating characteristics metadata to profiling tool 142 using semantics virtual machine profiling engine interface 144. The target profiles may comprise known healthy guest virtual machine 104 configurations and/or known compromised guest virtual machine 104 configurations. In an embodiment, semantics virtual profiling engine 146 may send the target profiles in a form or format similar to the virtual machine operating characteristics. Semantics virtual machine profiling engine interface 144 sends the target profile from semantics virtual machine profiling engine 146 in the kernel space 140 to profiling tool 142 in the user space 138 of the trusted measurement machine 108.

At step 908, profiling tool 142 compares the virtual machine operating characteristics metadata to the target profiles. For example, profiling tool 142 may compare the virtual machine operating characteristics metadata to known healthy configurations and known compromised configurations based on the target profiles and/or information from known threat aggregator 114. In an embodiment, profiling tool 142 may use known healthy configurations and known compromised configurations in a comparison to determine a classification for the virtual machine operating characteristics. In another embodiment, profiling tool 142 may use a clustering algorithm to determine whether the guest virtual machine 104 is compromised.

At step 910, profiling tool 142 determines whether the virtual machine operating characteristics metadata matches a healthy configuration. Profiling tool 132 may proceed to step 912 when profiling tool 142 determines that the virtual machine operating characteristics metadata matches a healthy configuration. At step 912, profiling tool 142 classifies the guest virtual machine 104 as healthy or in a healthy state and proceeds to step 920.

Returning to step 910, profiling tool 142 may proceed to step 914 when profiling tool 142 determines that the virtual machine operating characteristics metadata does not match a healthy configuration. At step 914, profiling tool 142 determines whether the virtual machine operating characteristics metadata matches a compromised configuration. Profiling tool 142 may proceed to step 916 when the virtual machine operating characteristics metadata matches a compromised configuration. At step 916, profiling tool 142 classifies the guest virtual machine 104 as compromised or in a compromised state and proceeds to step 920.

Returning to step 914, profiling tool 142 may proceed to step 918 when profiling tool 142 determines that the virtual machine operating characteristics metadata do not match a compromised configuration. At step 918, profiling tool 142 classifies the guest virtual machine 104 as unknown or in an unknown state and proceeds to step 920.

At step 920, profiling tool 142 sends the determined classification of the guest virtual machine 104 to vault management console 112. In an embodiment, profiling tool 142 may trigger an alarm by sending an alarm message to the vault management console 112 when the comparison is inconclusive. Vault management console 112 may notify a security manager that the guest virtual machine 104 cannot be classified as healthy or compromised and may further investigation may be necessary.

Optionally, at step 922, profiling tool 142 may store the virtual machine operating characteristics metadata and/or the determine classification. For example, trusted measurement machine 108 may store the virtual machine operating characteristics metadata and the determine classification when profiling tool 142 is able to classify the guest virtual machine 104 as healthy or compromised based on the virtual machine operating characteristics metadata associated with the guest virtual machine 104. The virtual machine operating characteristics metadata and the determine classification may be stored in database 302 as a known healthy configuration or known compromised configuration. Storing the virtual machine operating characteristics metadata and/or the determine classification may allow profiling tool 142 to use the stored virtual machine operating characteristics metadata to assist the clustering algorithm for future determinations of the guest virtual machine 104.

Figure 10:
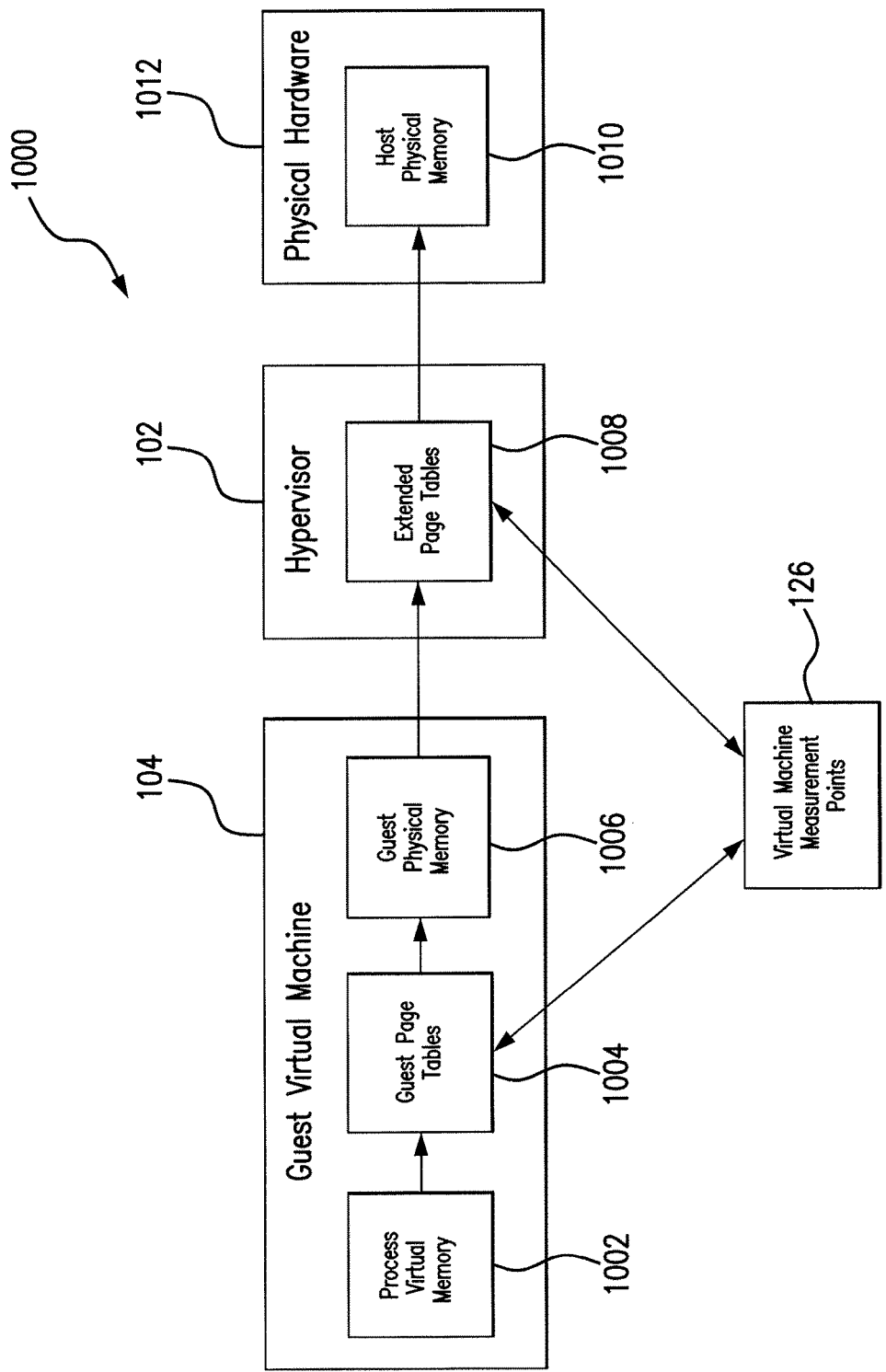
FIG. 10 is a schematic diagram of an embodiment of a configuration of virtual machine measurement points for memory metadata.

FIG. 10 is a schematic diagram of an embodiment of a configuration 1000 of virtual machine measurement points 126 for memory metadata. In an embodiment, hypervisor control point 124 may employ virtual machine measurement points 126 to collect memory metadata in response a measurement request for virtual machine operating characteristics memory metadata. In an embodiment, hypervisor control point 124 may employ hardware assisted paging using hypervisor 102 to monitor and capture guest page tables 1004. Guest page tables 1004 may provide the ability to monitor currently executing pages and their corresponding page frame number mapping RAM address. Hardware assisted paging may enable targeted RAM extraction and registry extraction for file metadata information. In an embodiment, virtual machine measurement points 126 may be configured to collect virtual machine operating characteristics memory metadata independent of the operating system of the guest virtual machine 104.

In an embodiment, guest virtual machine 104 comprises process virtual memory 1002, guest page tables 1004, and guest physical memory 1006. Guest page tables 1004 are configured to map process virtual memory 1002 to guest physical memory 1006. For example, guest page tables 1004 may provide a mapping between data in process virtual memory 1002 to the location of the corresponding data in guest physical memory 1006. Hypervisor 102 comprises extended page tables 1008. Extended page tables 1008 may be configured to map data in the memory of guest virtual machine 104 to host physical memory 1010 in physical hardware 1012.

Virtual machine measurement points 126 may be configured to collect memory metadata from guest virtual machine 104, hypervisor 102, and/or physical hardware 1012. For example, virtual machine measurement points 126 may be configured to collect one or more memory pages from guest page tables 1004 and one or more memory pages from extended page tables 1008. In an embodiment, the collected memory metadata may be used to determine whether a guest virtual machine 104 and/or the memory of a guest virtual machine 104 have been compromised. Alternatively, virtual machine measurement points 126 may be configured to collect any suitable combination of memory metadata. An example of determining whether a guest virtual machine 104 has been compromised using memory metadata is described in FIG. 11.

Figure 11:
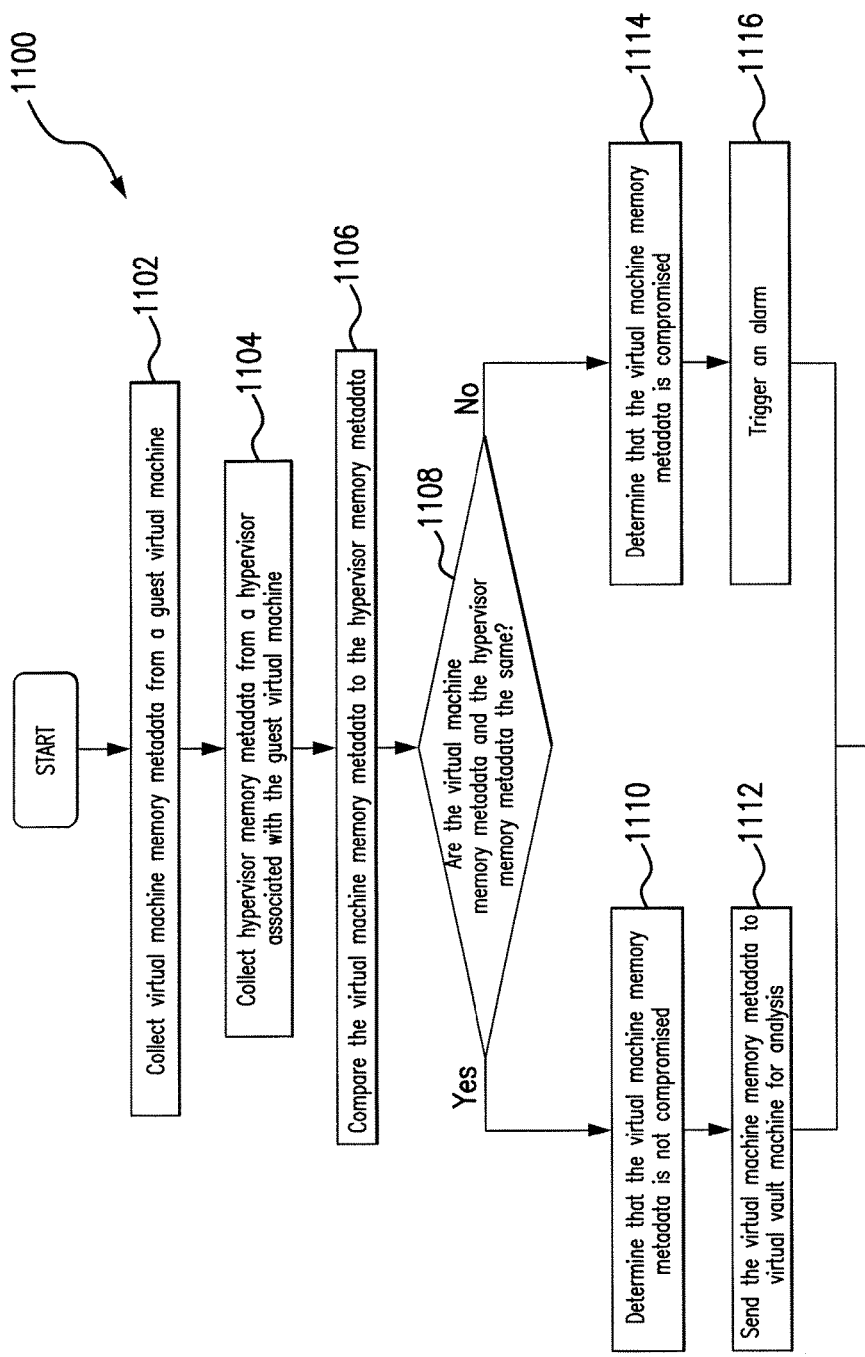
FIG. 11 is a flowchart of an embodiment of a memory metadata analysis method using virtual machine measurement points.

FIG. 11 is a flowchart of an embodiment of a memory metadata analysis method 1100 using virtual machine measurement points 126. Method 1100 may be employed by hypervisor control point 124 using virtual machine measurement points 126 to capture memory metadata from a guest virtual machine 104 and a hypervisor 102 that corresponds with the guest virtual machine 104 to determine whether the memory metadata from the guest virtual machine 104 has been compromised by comparing the memory metadata from the guest virtual machine 104 and the hypervisor 102. Compromised memory metadata from the guest virtual machine 104 may indicate that the operating system of the guest virtual machine 104 has been compromised and may not be trusted Uncompromised memory metadata from the guest virtual machine 104 may indicate that the operating system of the guest virtual machine 104 has not been compromised and may be trusted.

Hypervisor control points 124 are OS-isolated, however, a compromised operating system may affect the trustworthiness of virtual machine operating characteristics metadata that is extracted via hypervisor control points 124. In order to determine whether an operating system is compromised, hypervisor control points 124 may extract hypervisor memory metadata (e.g. hypervisor page tables) for comparison to virtual machine memory metadata (e.g. virtual machine page tables) of a guest virtual machine 104. Hypervisor control points 124 may extract virtual machine memory metadata and hypervisor memory metadata during an initialization period or at predetermined time periods.

At step 1102, hypervisor control point 124 employs virtual machine measurement points 126 to collect virtual machine memory metadata from a guest virtual machine 104. The virtual machine memory metadata may comprise one or more memory pages, one or more memory page tables, information about currently executing memory pages or programs, and/or data from one or more memory locations in the guest virtual machine 104. In one embodiment, virtual machine measurement points 126 may collect the virtual machine memory metadata from a random access memory of the guest machine 104.

At step 1104, hypervisor control points 124 employs virtual machine measurement point 126 to collect hypervisor memory metadata that corresponds with the virtual machine memory metadata from a hypervisor 102 that is associated with the guest virtual machine 104. The hypervisor memory metadata may comprise one or more memory pages, one or more memory page tables, information about currently executing memory pages or programs, and/or data from one or more memory locations in the hypervisor 102. The hypervisor memory is the same type of metadata as the virtual machine memory metadata from the guest virtual machine 104. For example, the hypervisor memory metadata comprises a memory page when the virtual machine memory metadata comprises a memory page. In one embodiment, virtual machine measurement points 126 may collect the hypervisor memory metadata from a random access memory of the hypervisor 102.

At step 1106, hypervisor control point 124 compares the virtual machine memory metadata to the hypervisor memory metadata to determine whether the virtual machine memory metadata and the hypervisor memory metadata are the same. In an embodiment, hypervisor control point 124 may compare the contents of the virtual machine memory metadata and the hypervisor memory metadata. Hypervisor control point 124 may determine that guest virtual machine 104 is compromised when the virtual machine memory metadata does not match the hypervisor memory metadata.

At step 1108, hypervisor control point 124 proceeds to step 1110 when the virtual machine memory metadata and the hypervisor memory metadata are the same. Otherwise, hypervisor control point 124 proceeds to step 1114 when the virtual machine memory metadata and the hypervisor memory metadata are the different.

At step 1110, hypervisor control point 124 determines that the virtual machine memory metadata is not compromised. At step 1112, hypervisor control point 124 sends virtual machine memory metadata to virtual vault machine 106 for further analysis.

Returning to step 1108, hypervisor control point 124 proceeds to step 1114 when the virtual machine memory metadata and the hypervisor memory metadata are the different. At step 1114, hypervisor control point 124 determines that the virtual machine memory metadata is compromised. At step 1116, hypervisor control point 124 triggers an alarm to notify a security administrator that the guest virtual machine 104 is compromised.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising: a processor; a virtual management console; a hypervisor configured to communicate packets comprising virtual machine operating characteristics metadata for guest virtual machines; and a virtual vault machine in communication with the virtual management console and the hypervisor, and comprising: a hypervisor device driver implemented by the processor to operate in a kernel space of the virtual vault machine, and configured to: receive a packet comprising virtual machine operating characteristics metadata for a guest virtual machine; and communicate the virtual machine operating characteristics metadata to an analysis tool using a hypervisor device driver interface; the hypervisor device driver interface implemented by the processor, and configured to: communicate the virtual machine operating characteristics metadata from the hypervisor device driver in the kernel space of the virtual vault machine to the analysis tool in a user space of the virtual vault machine, wherein the hypervisor device driver interface converts the virtual machine operating characteristics metadata from a first format used in the kernel space of the virtual vault machine to a second format used in the user space of the virtual vault machine and organizes the virtual machine operating characteristics metadata to allow the analysis tool to efficiently analyze a guest virtual machine; and the analysis tool implemented by the processor to operate in the user space of the virtual vault machine, and configured to: correlate the virtual machine operating characteristics metadata to one of a cluster of known healthy guest virtual machines or a cluster of known compromised guest virtual machines using a machine learning algorithm; classify the guest virtual machine as healthy when the virtual machine operating characteristics metadata correlates with the cluster of known healthy guest virtual machines; classify the guest virtual machine as compromised when the virtual machine operating characteristics metadata correlates with the cluster of known compromised guest virtual machines; generate analysis results by combining at least a portion of the virtual machine operating characteristics metadata with the determined classification; and communicate the analysis results to the virtual management console or a trusted measurement machine.

2. The system of claim 1, wherein the hypervisor device driver is configured to: receive encryption information used by a hypervisor control point in the guest virtual machine; and decrypt the packet based on the encryption information to retrieve the virtual machine operating characteristics metadata.

3. The system of claim 1, wherein the hypervisor device driver is configured to receive the packet from a tunnel connection comprising one or more virtual switches.

4. The system of claim 1, wherein the hypervisor device driver is configured to employ policy rules that accepts packets from the hypervisor and rejects packets from unknown sources.

5. The system of claim 1, wherein the analysis tool is configured to obtain the cluster of known healthy guest virtual machines data and the cluster of known compromised guest virtual machines data from a known threats aggregator.

6. The system of claim 1, wherein correlating the virtual machine operating characteristics metadata comprises: assigning weights to the virtual machine operating characteristics metadata; and comparing the weighted virtual machine operating characteristics metadata to a threshold to correlate the virtual machine operating characteristics metadata.

7. An apparatus comprising: processor: a hypervisor device driver implemented by the processor to operate in a kernel space of the virtual vault machine, and configured to: receive a packet comprising virtual machine operating characteristics metadata for a guest virtual machine; and communicate the virtual machine operating characteristics metadata to an analysis tool using a hypervisor device driver interface; the hypervisor device driver interface implemented by the processor, and configured to: communicate the virtual machine operating characteristics metadata from the hypervisor device driver in the kernel space of the virtual vault machine to the analysis tool in a user space of the virtual vault machine, wherein the hypervisor device driver interface converts the virtual machine operating characteristics metadata from a first format used in the kernel space of the virtual vault machine to a second format used in the user space of the virtual vault machine and organizes the virtual machine operating characteristics metadata to allow the analysis tool to efficiently analyze a guest virtual machine; and the analysis tool implemented by the processor to operate in the user space of the virtual vault machine, and configured to: correlate the virtual machine operating characteristics metadata to one of a cluster of known healthy guest virtual machines or a cluster of known compromised guest virtual machines using a machine learning algorithm; classify the guest virtual machine as healthy when the virtual machine operating characteristics metadata correlates with the cluster of known healthy guest virtual machines; classify the guest virtual machine as compromised when the virtual machine operating characteristics metadata correlates with the cluster of known compromised guest virtual machines; generate analysis results by combining at least a portion of the virtual machine operating characteristics metadata with the determined classification; and communicate the analysis results to a virtual management console or a trusted measurement machine.

8. The apparatus of claim 7, wherein the hypervisor device driver is configured to: receive encryption information used by a hypervisor control point in the guest virtual machine; and decrypt the packet based on the encryption information to retrieve the virtual machine operating characteristics metadata.

9. The apparatus of claim 7, wherein the hypervisor device driver is configured to receive the packet from a tunnel connection comprising one or more virtual switches.

10. The apparatus of claim 7, wherein the hypervisor device driver is configured to employ policy rules that accepts packets from the hypervisor and to reject packets from unknown sources.

11. The apparatus of claim 7, wherein the hypervisor device driver is configured to obtain the cluster of known healthy guest virtual machines data and the cluster of known compromised guest virtual machines data from a known threats aggregator.

12. The apparatus of claim 7, wherein correlating the virtual machine operating characteristics metadata comprises: assigning weights to the virtual machine operating characteristics; and comparing the weighted virtual machine operating characteristics metadata to a threshold to correlate the virtual machine operating characteristics metadata.

13. A virtual machine intrusion detection method comprising: receiving, at a hypervisor device driver implemented by a processor, a packet comprising virtual machine operating characteristics metadata for a guest virtual machine; communicating, by the hypervisor device driver, the virtual machine operating characteristics metadata from the hypervisor device driver in a kernel space of a virtual vault machine to an analysis tool in a user space of the virtual vault machine using a hypervisor device driver interface implemented by the processor, wherein the hypervisor device driver interface converts the virtual machine operating characteristics metadata from a first format used in the kernel space of the virtual vault machine to a second format used in the user space of the virtual vault machine and organizes the virtual machine operating characteristics metadata to allow the analysis tool to efficiently analyze a guest virtual machine; correlating, by the analysis tool implemented by the processor, the virtual machine operating characteristics metadata to one of a cluster of known healthy guest virtual machines or a cluster of known compromised guest virtual machines using a machine learning algorithm; classifying, by the analysis tool, the virtual machine operating characteristics metadata as one of healthy or compromised based on the correlation, wherein: the virtual machine operating characteristics metadata is classified as healthy when the virtual machine operating characteristics correlates with the cluster of known healthy guest virtual machines; and the virtual machine operating characteristics metadata is classified as compromised when the virtual machine operating characteristics correlates with the cluster of known compromised guest virtual machines; generating, by the analysis tool, analysis results by combining at least a portion of the virtual machine operating characteristics metadata with the determined classification; and communicating, by the analysis tool, the analysis results to a virtual management console or a trusted measurement machine.

14. The method of claim 13, further comprising: receiving, by the hypervisor device driver, encryption information used by a hypervisor control point in the guest virtual machine; and decrypting, by the hypervisor device driver, the packet based on the encryption information to retrieve the virtual machine operating characteristics metadata.

15. The method of claim 13, wherein the hypervisor device driver receives the packet from a tunnel connection comprising one or more virtual switches.

16. The method of claim 13, further comprising obtaining, by the analysis tool, the cluster of known healthy guest virtual machines data and the cluster of known compromised guest virtual machines data from a known threats aggregator.

17. The method of claim 13, wherein correlating the virtual machine operating characteristics metadata comprises: assigning weights to the virtual machine operating characteristics metadata; and comparing the weighted virtual machine operating characteristics metadata to a threshold to correlate the virtual machine operating characteristics metadata.

* * * * *